(12) United States Patent
Nishimoto

(10) Patent No.: US 11,327,145 B2
(45) Date of Patent: May 10, 2022

(54) POSITIONING, NAVIGATION, TIMING, RANGING, OR BEACON TRANSMISSION SYSTEM APPARATUS WHICH UTILIZES AND EXPLOITS—RELAYED, DELAYED, OR VIRTUAL TIMING MARKER TRANSMISSIONS OF GPS, GPS ALTERNATIVE, GNSS, PNT, ELECTRONIC, OPTIC, ACOUSTIC, OR SIMILAR SIGNALS

(71) Applicant: Kay Nishimoto, Lake Forest, CA (US)

(72) Inventor: Kay Nishimoto, Lake Forest, CA (US)

( * ) Notice: Subject to any disclaimer, the term of this patent is extended or adjusted under 35 U.S.C. 154(b) by 0 days.

(21) Appl. No.: 17/526,680

(22) Filed: Nov. 15, 2021

(65) Prior Publication Data

US 2022/0075019 A1 Mar. 10, 2022

Related U.S. Application Data

(63) Continuation-in-part of application No. 17/030,363, filed on Sep. 23, 2020, now abandoned.

(Continued)

(51) Int. Cl.
| | | |
|---|---|---|
| *G01S 1/68* | (2006.01) | |
| *G01S 5/02* | (2010.01) | |
| *G01S 1/04* | (2006.01) | |

(52) U.S. Cl.
CPC ........ *G01S 5/02216* (2020.05); *G01S 1/0428* (2019.08); *G01S 1/68* (2013.01); *G01S 5/0218* (2020.05); *G01S 5/0231* (2013.01)

(58) Field of Classification Search
CPC .. G01S 5/02216; G01S 5/0242; G01S 1/0428; G01S 1/68

(Continued)

(56) References Cited

U.S. PATENT DOCUMENTS

| 4,161,734 A | 7/1979 | Anderson |
|---|---|---|
| 9,774,414 B2 | 9/2017 | Nishimoto |

(Continued)

FOREIGN PATENT DOCUMENTS

KR 20150103818 A 9/2015

*Primary Examiner* — Harry K Liu
(74) *Attorney, Agent, or Firm* — Loza & Loza, LLP; Heidi Eisenhut

(57) ABSTRACT

Traditional "low-to-high waveform change" timing markers, in navigation or GPS signals, can be easily naturally or maliciously altered and require unshareable, high-resolution, high-capacity channels, often not government available. Whereas, message text format methods include proven error correction, redundancy, encryption, jam-resistance, concealability, spoof-resistance, multiuser, delayable messaging, channel efficiency, and downstream authentication. Herein, "virtual timing markers" exploit message format strengths and more. Because many navigating platforms also communicate voice, messages, or data, platforms and multiuser messages can simultaneously and unintrusively share the same transmission signal, which reduces onboard hardware, needed channel capacity, radio frequencies, costs, and infrastructure. FAA mandated, airliner collision avoidance broadcasts of their GPS location can unintrusively commingle navigation messages with aforementioned strengths as precise derivative GPS timing markers on existing, prolific broadcasts having 1000× greater power levels. "Relayed transmission pathways" can eliminate cumbersome traditional nanosecond synchronization of navigation transmitters or exploit inclusion of happenstance neighborhood transmitters. Additional features.

8 Claims, 16 Drawing Sheets

Location determination by TRADITIONAL TRILATERATION

Related U.S. Application Data

(60) Provisional application No. 62/903,956, filed on Sep. 23, 2019.

(58) Field of Classification Search
USPC .......................................................... 342/450
See application file for complete search history.

(56) References Cited

U.S. PATENT DOCUMENTS

| | | | |
|---|---|---|---|
| 2005/0154790 A1* | 7/2005 | Nagata | H04L 41/145 709/223 |
| 2011/0023050 A1* | 1/2011 | Strom | G06F 9/546 719/313 |
| 2011/0170465 A1 | 7/2011 | Tavildar et al. | |
| 2012/0051468 A1 | 3/2012 | Weitkemper | |
| 2014/0003558 A1 | 1/2014 | Ichikawa | |
| 2015/0103818 A1 | 4/2015 | Kuhn et al. | |
| 2016/0080110 A1* | 3/2016 | Gareau | H04L 1/0045 398/66 |
| 2019/0098625 A1* | 3/2019 | Johnson | H04B 7/026 |
| 2019/0222375 A1 | 7/2019 | Wu et al. | |
| 2020/0326419 A1 | 10/2020 | Parsche et al. | |

\* cited by examiner

Time interval mapping with known pauses at relay nodes B, C, & D when originator A transmits timing markers to B, C, D, & receiver-locator U A remapped rendition with VIRTUAL ARRIVALS OF TIMING MARKER replacement time interval legs which are time-aligned or converging on an arbitrarily chosen UN or $UN_{ArrivalMean}$ Intermediate "virtual pathways" may arrive with wider, shorter, or unchanged time intervals in-between as receiver #U moves along

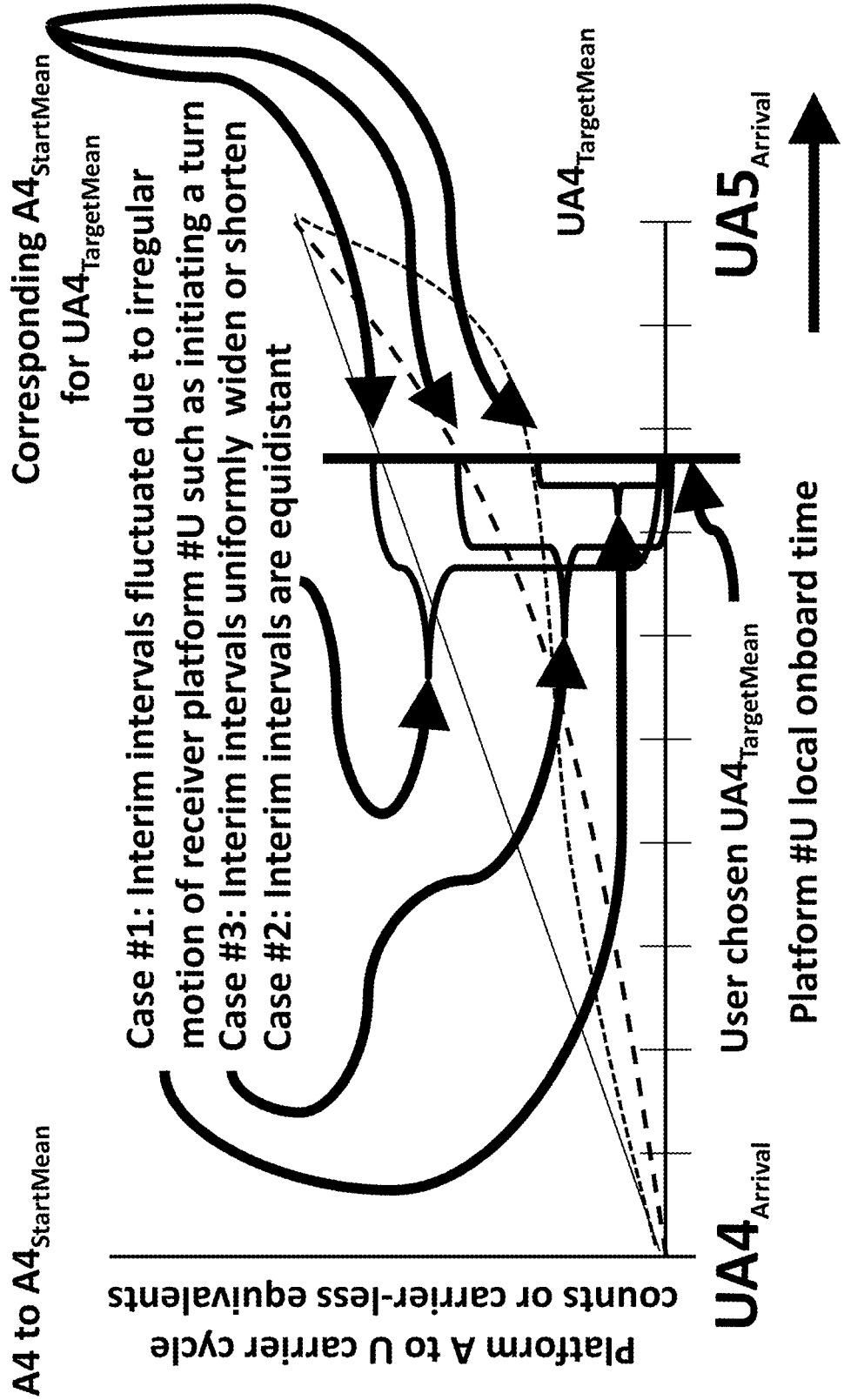

POSITIONING, NAVIGATION, TIMING, RANGING, OR BEACON TRANSMISSION SYSTEM APPARATUS WHICH UTILIZES AND EXPLOITS—RELAYED, DELAYED, OR VIRTUAL TIMING MARKER TRANSMISSIONS OF GPS, GPS ALTERNATIVE, GNSS, PNT, ELECTRONIC, OPTIC, ACOUSTIC, OR SIMILAR SIGNALS

CLAIM OF PRIORITY

This application is a continuation-in-part of and claims priority to and the benefit of U.S. patent application Ser. No. 17/030,363, filed in the United States Patent and Trademark Office on Sep. 23, 2020, which claims priority to and the benefit of provisional patent application No. 62/903,956, filed in the United States Patent and Trademark Office on Sep. 23, 2019, the entire content of which is incorporated herein by reference as if fully set forth below in its entirety and for all applicable purposes.

FIELD

Various aspects of the present disclosure relate to location-finding, positioning, navigation, timing, ranging, or beacon determination methods which use electronic, optic, or acoustic signal transmissions. These methods and options can enable, describe, and solve more complex relationships such as hundreds of transmitters, multiple regions of signal distortions, or relayed-or-straggling transmissions.

BACKGROUND

Traditional "physical" timing markers on radio signals are user defined waveform changes which indicate selected positions on radio signals which travel from a transmitter to a corresponding receiver. To distinguish "physical timing markers" from other types of timing markers known in the art, the present disclosure will utilize "physical timing markers" to distinguish from the other types of timing markers.

Unfortunately, physical timing markers, as very short (e.g., 1 microsecond to 10 nanosecond) waveforms on signals, can be easily distorted by natural causes or easily-and-maliciously repositioned by adversaries who transmit stronger neighboring signals. More generally, physical timing markers and their signal implementations are often (1) vulnerable to jamming or spoofing; (2) weak to detect or discern; (3) blocked by foliage, buildings, or high terrain; (4) hard to authenticate as not being spoofed; (5) the infrastructure is expensive or cumbersome (e.g., the cost, maintenance, and operation of 31 GPS satellites in orbit); and/or (6) most importantly it is constrained by Governments in terms of allowable frequencies, bandwidths, channel capacities, and signal strength.

Local, national, or international radio frequency congestion is an increasing problem and obtaining an allocation of frequency from Governments can be difficult or impossible. Traditional precision timing signals require unshareable, dedicated channels of high-resolution or equivalently high channel capacity.

Additionally, the potential for existing GPS spacecraft positioning navigation and timing systems to fail servicing location finders has long been acknowledged by the Air Force and many Government agencies. The Air Force, Navy, Army, DARPA, Coast Guard, Federal Aviation Administration, and Homeland Security for many years have been actively seeking alternatives which could be used whenever an existing traditional system fails at any local region. Many obstacles have arisen in seeking alternatives, such as expensive infrastructures having new backup transmitters and new receivers, as well as the unavailability of radio frequencies which are rationed by the FCC. These transmitters need to send their exact location and precise time of transmission so that user location finders can determine the signal travel time. Consequently, microsecond or nanosecond precision timing markers are key components in these transmissions. Traditional GPS signal implementations require very high channel capacities from a continuous 1 million to 1.0 billion bits per second signal. Ironically, GPS receiver participants only need to detect timing markers which only arrive at 1 or 6 second intervals. Other content is far less time critical and only contains a meager 50 bits per second.

Virtual Timing Marker Features and Benefits to Traditional Navigation Methods and Apparatus "Virtual timing markers", methods, and apparatus are described in Inventor's U.S. Pat. No. 9,774,414 titled "Methods and Apparatus for Providing and Utilizing Virtual Timing Markers".

Unlike traditional physical timing markers and signal shortcomings as discussed above, traditional message text format methods already offer proven error correction algorithms, multiple-copy redundancy, encryption, jam-resistance, building penetration, spoof-resistance, access by multiple users, and downstream user authentication of questionable messages.

Historically, when transmissions become garbled by electrical interference, most physical timing markers, which typically span short intervals (e.g., 10 to 1000 nanoseconds), are garbled-or-lost or at best correctable only by a few bits (e.g., "interleaved" bit trains and FEC forward error correction algorithms) or completely redundant transmission signals. There is no downstream detection-or-authentication that one-or-more physical timing markers have not been altered by spoofers. However, since virtual timing markers are "messages", any message errors can be more detectable and correctable by using commonly established message-transmission methods. Furthermore, any virtual timing marker message can be additionally inserted by forming multiple copies on different-and-separate available unused-signal-intervals-or-reference-points-on-signals to increase the likelihood that the virtual timing marker message will be detected, received, decrypted, correctly rendered, or authenticated.

Accordingly, there exists a need to provide methods and apparatus for improving positioning, navigation, timing, ranging, or beacon transmission system apparatus which utilize and exploit—relayed, delayed, or virtual timing marker transmissions of GPS, GPS alternative, Global Navigation Satellite System (GNSS), PNT, electronic, optic, acoustic, or similar signals.

SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Traditional "low-to-high waveform change" timing markers, in navigation or GPS signals, can be easily naturally or maliciously altered and require unshareable, high-resolution, high-capacity channels, often not government available. Whereas, message text format methods include proven error correction, redundancy, encryption, jam-resistance, concealability, spoof-resistance, multiuser, delayable messaging, channel efficiency, and downstream authentication. Herein, "virtual timing markers" exploit message format strengths and more. Because many navigating platforms also communicate voice, messages, or data, platforms and multiuser messages can simultaneously and unintrusively share the same transmission signal, which reduces onboard hardware, needed channel capacity, radio frequencies, costs, and infrastructure. FAA mandated, airliner collision avoidance broadcasts of their GPS location can unintrusively commingle navigation messages with aforementioned strengths as precise derivative GPS timing markers on existing, prolific broadcasts having 1000× greater power levels. "Relayed transmission pathways" can eliminate cumbersome traditional nanosecond synchronization of navigation transmitters or exploit inclusion of happenstance neighborhood transmitters. Additional features are described below in the detailed description.

BRIEF DESCRIPTION OF THE DRAWINGS

The accompanying drawings are provided together with the following descriptions of embodiments for a better comprehension of the present inventions. The drawings and the embodiments are illustrative of the present inventions, and are not intended to limit the scope of the present inventions. It is understood that a person of ordinary skill in the art may modify the drawings to generate drawings of other embodiments that would still fall within the scope of the present inventions.

FIG. 16 shows "For any arbitrarily chosen UA4$_{Arrival}$ to UA4$_{TargetMean}$, the corresponding time interval on platform #A is needed which is A4 to A4$_{StartMean}$".

DETAILED DESCRIPTION

Figure 1:
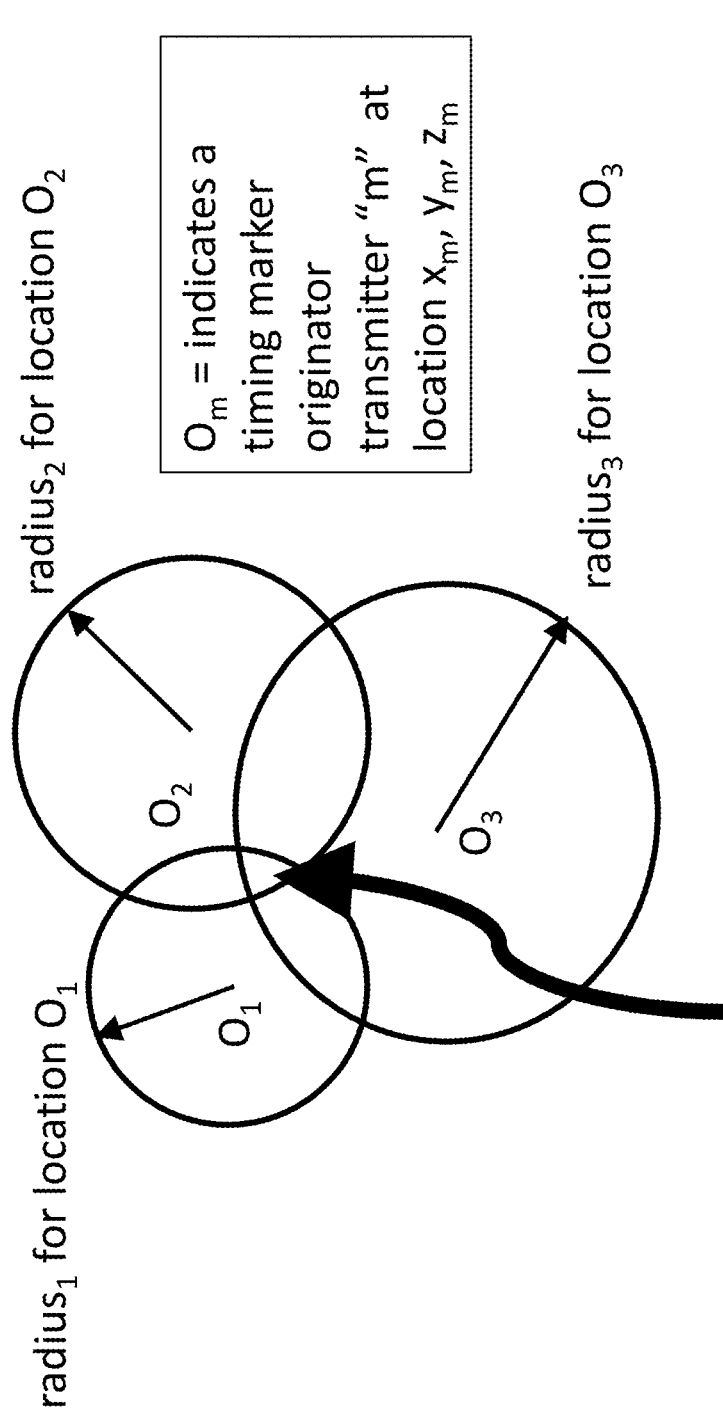
FIG. 1 illustrates an example of location determination by traditional trilateration.

The following detailed description discloses methods and apparatus for improving timing markers, such as through the use of virtual timing markers. The description is not to be taken in a limiting sense, but is made merely for the purpose of illustrating the general principles of the invention. Furthermore, specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown in detail in order not to obscure the embodiments. It should be understood that the embodiments are used only to illustrate and describe the present methods and inventions, and are not to be interpreted as limiting the scope of the present disclosure.

Terms

"Comprise" and variations, such as "comprising" and "comprises," are not intended to exclude other additives, components, integers or steps. "A," "an," and "the" and similar referents used herein are to be construed to cover both the singular and the plural unless their usage in context indicates otherwise. The word "exemplary" is used herein to mean "serving as an example, instance, or illustration." Any implementation or embodiment described herein as "exemplary" is not necessarily to be construed as preferred or advantageous over other embodiments or implementations. Likewise, "embodiments" does not require that all embodiments include the discussed feature, advantage or mode of operation.

"Aspects" do not require that all aspects of the disclosure include the discussed features, advantages, or modes of operation. "Coupled" is used herein to means the direct or indirect coupling between two objects. For example, if object A physically touches or couples to object B, and object B touches or couples to object C, then objects A and C may still be considered coupled to one another, even if they do not directly physically touch each other.

The term "or"—(1) as used herein, and unless expressly stated to the contrary, "or" refers to an inclusive-or and not to an exclusive-or; (2) as used herein when used in a declared series, collection, and-or list of two or more enumerated items, "or" means one or a combination of the immediate enumerated items thereof; (3) "or" as used herein is an "inclusive or" as in: (i) "inclusive or" means "either this, or that, or both" and (ii) in contrast, "exclusive or" means "either this or that, but not both".

The terminology "and-or" and "and/or"—(1) as used herein, and unless expressly stated to the contrary, either or both "and-or" and "and/or" refers to an inclusive-or and not to an exclusive-or; (2) herein, the same as the inclusive "or" above, (3) herein, means one or a combination of the immediate enumerated items, list, or cluster thereof.

A timing signal—is a transmission signal or signal interval which contains at least one timing marker.

A "physical timing marker"—indicates the location of a position on a transmission signal and comprises a defined signal waveform change.

A "virtual timing marker" is determined and formed at an upstream transmission platform so that the virtual timing marker (1) indicates the location of a first selected target timing marker position on a transmission signal; and (2) comprises a message containing the determined displacement or the time-offset of the first selected target timing marker position on the transmission signal from a second indicated position of a physical timing marker or another virtual timing marker in the same or another referenceable transmission signal which is referenceable both at the upstream transmission platform and any corresponding receiver; (i.e., not a "phantom virtual timing marker" which is defined further below).

"Virtual timing markers" can substitute or augment traditional "physical" timing markers as the "virtual timing markers" can feature improved or alternative signals as well as better support location-finding or other PNT methods. The features of the "virtual timing markers" can include (a) multiple classes or communities of encryption for separate users (while using the same or different transmission channels); (b) delay tolerance of virtual timing marker departures as their messages are signal position independent while still indicating the same targeted signal position; (c) spacing virtual timing marker messages at irregular intervals to conceal them from jammers or spoofers; (d) un-intrusive signal sharing by merging or piggybacking virtual timing markers in the form of messages on one or more dedicated or other purpose transmission signals; and (e) reduced-or-eliminated multiplexing by merging multiple tributary physical timing marker signals as multiple position-independent virtual timing marker messages onto a single signal before any multiplexing-or-transmission. Additionally, "virtual timing marker" solutions can increase preciseness for a given signal capacity or equivalently reduce the needed signal channel capacity when timing markers on modulated contours of signals, with an underlying carrier, are instead replaced by virtual timing markers which are defined to reference waveform changes on the far more precise underlying carrier itself or carrier-less equivalents. The intensified amount of processing to detect timing markers within the carrier can be reduced by using other virtual timing marker methods.

Some of the claims, herein, use-modify-or-augment the referenced "virtual timing markers", methods, or apparatus to achieve well-established or new MESSAGE format strengths. Further benefits are also claimed herein.

"Virtual timing markers" in the methods and apparatuses disclosed herein may be used to achieve well-established or new message format strengths.

"Virtual" in the present disclosure includes the definitions of "very close to being something without actually being it" or "existing or resulting in essence or effect though not in actual fact, form, or name" as opposed to physical timing markers which are designer-defined waveform changes on a signal. "Virtual timing markers" comprise a message format. Instead of (physical) timing markers which are designer-defined waveform changes on a signal, "virtual timing markers" comprise a message format.

A "timing marker" can be either a physical timing marker or a virtual timing marker. More precisely a "timing marker" shows the location of a targeted signal position of a virtual timing marker or a physical timing marker instead of the interval or space occupied by the message of the virtual timing marker message or the prelude-and-or-any-sequel to the physical timing marker waveform change. In this document, one-or-more "timing markers" comprise either one-or-more physical timing markers, one-or-more virtual timing markers, or a combination of both.

Prior Patented Methods and Apparatus can Reduce the Required Output Channel Capacity of Multiple Input Tributary Timing Marker Signals As discussed above, traditional physical timing markers on traditional single-hop transmission signals require high resolution, high capacity radio transmission channels which must be uninterruptible, unshared, over critical time-intervals and thus dedicated for timing markers to be detected and precisely time-tagged. The transmission channels must be unshared or dedicated over critical time-intervals because only one timing marker waveform change can occur on a signal interval without overlapping some portion of the same interval with another physical timing marker or other signal content waveforms.

In a situation where 5 independent physical timing markers can occur simultaneously, traditional implementations require 5 separate-and-independent high-capacity transmission channels. As a result, multiplexing the 5 separate signals into a single transmission requires a channel capacity which is equal-to-or-greater-than the sum of all the 5 channel capacities.

However, in contrast to implementing the sum of all the 5 channel capacities, "virtual timing marker" methods and apparatus, as described in U.S. Pat. No. 9,774,414 as well as in further detail below, can now enable the use of a single signal transmission channel which requires either (a) only the "highest individual capacity" of the original 5 tributary-channels or (b) an even further reduced capacity below the aforementioned "highest individual capacity" such as by using virtual timing markers to reference defined waveform changes in the more precise underlying carrier. This can happen while additionally, simultaneously, providing stronger jam-resistance, spoof-resistance, or other virtual timing marker features.

Enabling Timing Markers to Unintrusively Share Transmission Channels or Piggyback on Other Signals by Using Prior Patented Virtual Timing Marker Methods or Apparatus Any signal interference or distortion interval (e.g., 10 to 1000 nanoseconds duration) which overlaps a timing marker (waveform change) can obscure or overwrite the physical timing marker. Only one position on a signal corresponds to a physical timing marker, thus there can be only one properly positioned physical timing marker and no multiple backup (redundant) copies and no dispersion over long time-intervals to avoid interference (other than (a) multiplexing or (b) additional single purpose navigation—signals, transmitters, receivers, or frequencies). In contrast, any signal position can be indicated by one or multiple-redundant dispersed virtual-timing-markers-with-different-reference-signal-positions because their messages can be placed and/or shifted essentially anywhere nearby along the signal; each message would reference a different signal position.

Indicated signal positions of virtual timing markers can overlap other virtual timing markers or other signal waveforms as messages are position independent on a signal and multiple "virtual timing marker" messages can be placed anywhere on available spaces along the same signal even though their indicated positions may overlap each other or other waveforms on the signal. Thus, virtual timing markers as messages can unintrusively share-or-piggyback on other purpose signals by placing virtual timing markers as messages on unused and available signal intervals, unused packet headers, or unused content regions of the other purpose signals.

Signals which contain physical timing markers have traditionally required a dedicated, uninterruptible high capacity channel which must increase with any increase in the required precision.

Virtual timing markers can reduce the required channel capacity for a given timing marker precision when used to substitute any anticipated physical timing markers (which are formed by traditional multi-cycle enveloping coded timing markers) with virtual timing marker message references to user-defined underlying carrier waveform changes or carrier-less equivalents. These virtual timing markers are (1) position-independent on the signal; (2) interruptible; and (3) unintrusively shareable on the same signal with the optional features: noise-tolerance, error-correction, concealment, multiple classes and communities of encryption, jam-resistance, and spoof-resistance. Virtual timing marker embedded commands and protocols can be used to isolate candidate scanning intervals which contain carrier-based timing markers to reduce processing which is required for waveform detection and for waveform parameter measurements.

Virtual timing markers can also reduce a high channel capacity requirement by "merging virtual timing markers" of two-or-more timing-marker-signal tributaries instead of multiplexing them into a larger signal which would need a far larger channel capacity comprising the sum of the channel capacities of all the pertinent tributaries. Existing 1) radio frequency channel congestion; (2) "FCC licensed spectrum" unavailability; and (3) commonplace adjacent frequency "crosstalk" signal power interference by neighboring signals make it very difficult to obtain a new dedicated radio channel from the Federal Communications Commission (FCC), but these restrictions can be bypassed by piggybacking virtual timing markers on (already FCC authorized and licensed) "other-purpose signals".

GPS uses radio frequencies which have short wavelengths to accommodate portable receivers with small antennas. Also, GPS signals arrive at a very, very low power level which is very difficult for receivers to discern and easy for spoofers to alter. Even thin ceilings, walls, or foliage can block reception of GPS signals. Since many applications have other communications systems, such as onboard aircraft collision avoidance locators or emergency-response vehicles, it makes sense that some of their radio frequencies (e.g., LF, MF, HF, VHF, UHF, SHF) which normally use signal power levels which are thousands of times greater than GPS, can be (a) more easily detected, discerned, and measured as well as (b) unintrusively shared with navigation virtual timing markers in the form of messages (i) to penetrate ceilings, walls, or foliage or (ii) to reduce transmitter-receiver infrastructure, onboard hardware, maintenance, or staffing.

Any "other purpose signals" can be transmitted either (1) by the same transmitter-platform or (2) by "other happenstance neighborhood transmitters of opportunity". In either case, multiple related-or-unrelated messages (especially virtual timing markers as messages) can simultaneously and unintrusively share the same radio frequencies, channel capacities, communications hardware, and immediate-or-delayable "who can talk now" protocols with minimal impact or added costs.

Local Wireless Sensor Networks and Beacons

In recent years, local wireless sensor networks have increased attention to transmission network node location, determination. or estimation. These applications often have many static nodes and add several alternative ranging methods to address wall or building obstructions of signals, signal reflectors, or signal-frequency-or-power interference with each other with less need for accuracy or precision under less demanding dynamic configurations.

Prior art related to "iterative multilateration" and "collaborative multilateration" style methods for "estimating node locations" heavily rely on (1) individual single-hop node-to-node ranging techniques for wireless networks in a static node configuration; and (2) overpopulated or best guess reference estimation methods and do not utilize use "virtual timing markers", methods, or apparatus.

A "beacon" is a source of one or more radio transmissions, optic signals, or acoustic signals which serve as an indicator, warning, or guide. More recently, a beacon can also be a stationary or mobile (originator like or relay like) transmitter node on a platform which emits one or more timing markers on one or more transmission signals to one or more mobile platforms which can receive, process, and interpret the signals from one or more beacons to (1) determine PNT or ranging parameters-or-vectors; or (2) to address the less challenging tasks of (a) warning of potential collisions or (b) determining presence-proximity-closure-rate-or-direction. Presence, proximity, closure rate, or direction can be determined by (1) detecting a selected transmission signal; (2) tracking shifts in the frequency of indicated-timing-marker-arrivals, carrier-cycles (i.e., Doppler shifts), or carrier-less equivalents; (3) using any received transmitter node velocity vector information; or (4) determined PNT or ranging parameters or vectors. Beacon transmission signals may or may not be designed to have predefined physical timing markers, but can be used with defined selected beacon signal waveform changes on selected beacon signals to be interpreted as physical timing markers.

Currently beacons often serve local areas such as ships near the coast, collision avoidance for surface traffic at airports, or local area sensor networks.

Historically, "beacons" have been (1) signal fires commonly on a hill, tower, or pole; (2) lighthouses; or (3) radio transmitters which guide or warn of potential nearby or approaching objects which may result in collisions. Primitive beacons may sometimes only indicate their nearby presence. A collision avoidance beacon can be useful even when it is only known that the beacon and its platform are near or approaching a receiver without any knowledge-or-determination of the beacon's absolute or relative location.

As beacon signals can be used to indicate potential forthcoming collisions or their relative proximity to stationary or mobile platforms, they may be increasingly useful in the future for self-driving cars, train collision avoidance, aircraft, drones, or other local area traffic. However, prolific beacon and transmitter nodes will be limited by radio frequency congestion, electronic misinformation spoofing by hackers, potential jamming, building obstructions, the cost of onboard or supporting transmitter-receiver infrastructures, or the reticence of critical users to trust beacon signals but these problems can be addressed by a wide array of virtual timing marker methods, relayed signals, or other methods as described in the present disclosure. Additionally, virtual timing markers, which are in the form of position independent messages, can be unintrusively and economically "piggybacked" on other purpose signals such as voice, message, or data channels which are commonly in use by mobile platforms or stationary supporting transmitter nodes. Any signal timing marker delays in radio traffic "who can talk now" protocols or "who can talk now" time-division multiplexing can be addressed with virtual timing marker methods and apparatus. Thus, PNT, ranging, or beacon transmissions can piggyback on thousands of nearby mobile-or-stationary transmitter nodes which were originally dedicated for other purposes.

Terminology

A "signal element" is the shortest logical waveform unit that a signal transmitter can send. "Dispersed" is defined as having (1) at least 4 transmission nodes separated, noncollinear, and non-planar for a 3D problem space; (2) at least 3 transmission nodes separated and noncollinear for a 2D problem space; or (3) at least 2 transmission nodes separated for a 1D problem space—unless additional information is used to reduce the aforementioned minimum number of transmission nodes.

"Ranging" is the activity of measuring the transit transmission time interval or the distance from one node point to another target node point in the 1D, 2D, or 3D problem space. Ranging has been particularly useful in 3D sensing applications where distance is determined by measuring and/or calculating (a) the "time of (timing marker) flight" or (b) accounting for any time delays which are involved "between the emission of laser light" and "when it arrives at the detector".

"One-way ranging" is the activity of "accurately measuring or determining the transit transmission time interval or distance between a transmitter and receiver" by some form of transmitting one-or-more signals from one or more transmitters to one-or-more receivers. This may include trilateration or multilateration.

"Two-way ranging" is the activity "accurately measuring the transit time interval or distance between two transmission nodes" by transmitting a signal from a master transmitter to a slave transmitter-or-reflector and back; two-way ranging can include gathering, measuring, knowing, determining, or associating selected transit-times, transit-distances, directions, magnitudes, parameters, or vectors for PNT, beacon, radio, radar, sonar, acoustic, laser, LiDAR, or similar signals.

"Positioning, Navigation, and Timing" or ("PNT"), according to navigation experts, means one or a combination of two or more of three distinct constituent capabilities. The capabilities are (1) "positioning", which is the ability to accurately and precisely determine ones location and orientation referenced to a coordinate system; (2) "navigation", which is the ability to determine current and desired position (relative or absolute) and apply corrections to course, orientation, and speed to attain a desired position; and (3) "timing", which is the ability to acquire and maintain accurate and precise time from a standard and within user-defined timeliness parameters. It is noted that "timing" includes time transfer. "PNT" or "positioning, navigation, and timing" in the present disclosure can also include the ability to perform "ranging" or one or more aforementioned "beacon" signal activities or features. More specifically in this document the "positioning, navigation, and timing" or "PNT" also include the ranging or beacon capabilities.

"Relay" is the action with properties to (1) receive transmission signals or signal elements on one system and re-transmit them to one or more other systems; or (2) (i) reflect, (ii) deflect, or (iii) otherwise encounter and forward signals—in one direction, several different directions, or broadcast patterns and with significant, insignificant, or no associated delays in doing so. There may be associated translation or conversion of signals.

An "originating transmitter" initiates one-or-more transmissions of one or more physical timing markers on one or more signal pathways which may or may not encounter one or more intervening relay transmission nodes to a corresponding receiver. The originating transmitter is not a relay transmitter and thus does not transmit a timing marker as a direct result of receiving a timing marker from an upstream transmitter.

As described previously, a "beacon" is a source of one-or-more radio transmissions, optic signals, or acoustic signals which serve as a signal, warning, or guide. A "beacon" can also be a stationary or mobile (originator-like or relay-like) transmitter node on a platform which emits one-or-more timing markers on one-or-more transmission signals to one-or-more stationary-or-mobile platforms which can receive, process, and interpret the signals from one-or-more beacons to (1) support receiver determination of PNT or ranging parameters or vectors; (2) support receiver determination of presence, proximity, closure rate, or direction; or (3) to support warnings of potential collisions at receivers. A beacon transmission signal may or may not intentionally have predefined physical timing markers.

A "non-client" or "non-end-user" is a transmitter, relay-transmitter, reflector, or receiver node which is not a current active client which is trying to determine a location, distance, or other PNT parameter-or-vector.

A "non-client receiver" or a "constituent type receiver" may be a component of the transmitter system apparatus. The "non-client receiver" or the "constituent type receiver" may create-or-utilize time, position, or displacement tags pertinent to indicating timing marker arrivals. Additionally, the "non-client receiver" or the "constituent type receiver" may forward raw or derived information to pertinent location determination platforms to help determine the location or other PNT information of originating or relay transmitter platforms.

A "node", herein, is stationary or moving transmission endpoint or intermediate connection point on a transmission pathway. The stationary or moving connection point can receive, create, store, convert, relay, reflect, replace, augment, transmit, and/or send transmission signals along distributed or dispersed static and/or dynamic pathways. A transmission signal endpoint or a redistribution point has the capability to originate, relay, recognize, receive, process, transform, convert, reflect, substitute, and/or augment transmission signals. Additionally, the transmission signal endpoint or a redistribution point has the capability to forward transmission signals to one or more other transmission nodes.

A "multi-hop transmission signal pathway" is an originator transmitter to final corresponding receiver pathway which contains one or more intervening transmission nodes which comprise a relay transmitter, translator converter, repeater transmitter, or reflector at each intervening node.

A "single hop" is one distinct beginning-to-final-end transmission pathway from a transmitter to a corresponding receiver with no intervening relay transmissions.

A "multiple hop" comprises at least one distinct beginning to final end transmission pathway from a transmitter to a corresponding receiver with one or more intervening relay transmission nodes or reflectors (hence two-hops, three-hops, etc.). (Note: While there may be existing location finding or other PNT systems which use more than one hop (1) to calibrate their timing systems and signals to known "standard" distances or reference points or (2) to guess or converge on underlying carrier waveforms to resolve "carrier ambiguities", they do not use or conform to the "multiple hop" definition, model, or methods herein).

"Single and multiple hop" is a plurality of complete beginning to final end transmission pathways from a transmitter to a corresponding target receiver where (1) an originating transmission has more than one complete pathways to the same target receiver; and (2) at least one of the complete pathways includes multiple hops. "Single and multiple hop" may also be understood to include the special case where all the pathways are "multiple hop" with no "single hop".

"Multi-hop" means the same as "multiple-hop".

"Multiple-hop" includes "single and multiple hop" transmission pathways which have at least one multiple-hop pathway.

"Synchronizing" or "time-synchronizing" are the act using or making one or more instance sets of timing markers depart from two or more originating (i.e., non-relay) transmitters either (i) at the same absolute time; or (ii) with intended known-or-determinable time or displacement offsets relative to each other.

"Synchronized transmitters" or "time-synchronized transmitters" are originators of timing markers on transmission signals which have one-or-more sets of their departing timing markers time-synchronized or intentionally time-or-displacement-offset with those of other originators in the system.

A "constituent" is a transmission node or subsystem which is part of an (owned, operated, controlled, and maintained) transmission system infrastructure which provides positioning, navigation, timing, ranging, or beacon services—as opposed to either (1) a client or customer receiver locator or (2) other happenstance other purpose transmitter in the neighborhood—especially any owned, operated, controlled, or maintained by an outside organization. Any such happenstance node or its transmissions may still be used by the transmission system infrastructure.

A "client", "customer", "specimen" and "end-user" is a transmitter or receiver node whose location, velocity, range, or other PNT information is desired and which utilizes the services of a location finding or other PNT like provider system as opposed to a transmitter, relay transmitter, or receiver (a) which acts as part of a provider's determination implementation infrastructure as either a constituent node or a non-constituent happenstance node of opportunity; and (b) whose location or velocity is already known or determinable when a timing marker departs or arrives.

"Straggle" is defined as "to leave, arrive, or occur at irregular intervals" or "to spread or be spread in a scattered fashion at irregular intervals".

"Transit time summation equation" represents an instance of one or more selected single and/or multiple-hop pathways of one or more timing markers from one same and selected upstream transmission node to a one-same-and-selected downstream node. The equation is formed such that each side of the equation contains either: (a) a first selected or alternative pathway summation of (i) node-to-node transit time intervals between the aforementioned upstream and downstream nodes; (ii) any delays at any intervening nodes; and (iii) any pertinent time-offsets of indicated timing marker arrivals or departures from other timing markers comprising known or determinable variables; or (b) a measured or provided total end to end elapsed transit time for upstream to downstream travel.

A "recent intervening timing marker offset table" comprises, for a preceding departing timing marker time interval between timing markers, two-or-more entries of intervening data points where each entry includes: (1) (a) the precise location, displacement, or offset of the transmitter; or (b) raw data for determining such; and (2) the corresponding elapsed time, carrier cycle and fractional counts, displacements, or carrier-less equivalents since the first departing timing marker bounding the interval, for example with ten or a hundred entries per designated timing marker departure interval.

A "phantom virtual timing marker" or "interpolated-or-extrapolated virtual timing marker" indicates a phantom location of a first interpolated-or-extrapolated target position on a transmission signal and represents an interpolated-or-extrapolated displacement or time-offset of the first target position on the transmission signal from a second interpolated-or-extrapolated-or-actual indicated position which is derived from either data pertaining to one or more nearby (a) physical timing markers; or (b) other virtual timing markers in the same or another referenceable transmission signal which is referenceable both at the determination platform and any corresponding-receiver.

A "software-defined radio" or "SDR" is an implementation of a radio communications transmitter, receiver, or subsystem-of-either-or-both—where many components that have been traditionally implemented in hardware (e.g. mixers, filters, amplifiers, modulators, demodulators, detectors, etc.) are instead implemented by software. Software-defined radio methods can make it much easier to implement virtual timing markers on recent or forthcoming radio equipment because the software already looks at signal carrier-or-carrier-less-equivalent waveform.

Additional Terminology Properties

"Physical timing markers" are traditional types of reference points in a transmission signal which, for example, can be (1) digital transitions from zero to one; (2) an n percent rise in the signal from the minimum to maximum value; (3) an on-off break in the signal; (4) the nth bit of a packet; (5) well-defined peaks, zero crossings, or changes in an underlying signal carrier waveform; or (6) similarly, well-defined changes in an underlying carrier-less equivalent waveform, etc. Intrinsic physical timing markers, such as the beginning of a frame or line in successive video frames, can also appear in signal transmissions even if they were not intended as such.

"Virtual timing markers" are messages which substitute or augment physical timing markers with relocatable messages containing displacements or time-offsets to indicate signal positions of physical timing markers or virtual timing markers in a reference signal waveform. Virtual timing marker methods can improve transmission performance, qualities, operation, or use such as: a) enabling "indicated signal positions of virtual timing markers" to overlap other timing markers or other signal content waveforms because virtual timing marker messages can be relocated by merely moving them to other available spaces; b) seamlessly span over intermittent signals or "who can talk now" protocol gaps; c) to increase signal content efficiency by alternatively referencing the more precise underlying signal carrier waveforms or carrier-less equivalents; d) increasing signal content efficiency (i) by merging physical timing marker tributary signals into fewer virtual timing marker signals before any multiplexing; or (ii) by any merging which would eliminate any need for multiplexing; e) supporting timing marker error detection and correction by using traditional message integrity technology on virtual timing marker messages; f) to enable timing markers to span over signal gaps or bursts of radio interference of anticipated finite durations; g) statistical precision enhancement; h) concealing timing markers from jammers by irregularly spacing virtual timing marker messages or reference signal positions; i) multiple subscriber access by different virtual timing marker message encryption keys or passwords; j) handling high precision positioning navigation or timing signals such as in relaying them or unintrusively piggybacking them on other purpose signals; and k) enabling the use of low capacity or secondary channels for virtual timing marker messages (meanwhile any referenced physical timing markers require enough resolution/high-capacity for the precision required).

Traditional Single-Hop Trilateration or Multilateration for Determination of Location or Other PNT Parameters When determining the location of a receiver in three-dimensional space, both traditional trilateration and multilateration implementation options rely on three (3) or more widely dispersed transmitters with time-synchronized clocks to originate timing marker departures on signals.

Traditional trilateration (e.g., using GPS spacecraft transmitters) relies on (i) determining the travel time intervals of single-hop timing markers to corresponding receivers; (ii) the geometry and intersections of circles or spheres centered on the transmitters; and (iii) calculations of the circular or spherical distances of the target-receiver from the originating transmitters.

Traditional multilateration (e.g., using eLoran hilltop transmitters) relies on (i) determining the time-difference-of-arrivals-of-timing-markers of single-hop timing markers reaching the target-receiver; (ii) rendering these as differences-of-travel-time-intervals-or-distances from originating transmitters; (iii) re-rendering the same differences-of-travel-time-intervals-or-distances from originating transmitters in the mathematical equivalent geometry of intersecting hyperbolas or hyperboloids with transmitter locations as "geometric foci" of the hyperbolas or hyperboloids; and (iv) calculating the hyperbolic or hyperboloid distances of the target-receiver from the originating transmitters.

Piggybacking Virtual Timing Markers May Involve Multiple-Hop Relay Transmissions Architectures which can piggyback timing markers on other-purpose signals may often take advantage of other purpose, happenstance, transmitters—which, in turn, implies using relay transmission implementations or "multiple-hop" transmissions of timing markers. For example, by 2020 most US aircraft must broadcast their GPS location to FAA ground stations once-a-second for collision avoidance. If they were to add timing markers which correspond to their location, they could become very prolific with thousands of GPS-like transmitter sources at far greater signal power levels and at minimal additional cost or additional infrastructure. When using traditional methods, such an aircraft must wait its turn to broadcast on the same radio channel and thus the departure of any navigation timing marker is restricted. Alternatively, each cooperating aircraft must acquire an additional separate uninterruptible dedicated high-capacity radio channel, which is essentially unavailable-from-the-government-FCC, and add additional transmitters or receivers—or alternatively one can use a virtual timing marker implementation.

Another mode of sharing transmission signals from other-purpose-third-party transmitters is to use other-purpose-third-party "originating" (i.e., not relay) transmitters to "originate" the instances of timing marker travel—directly and-or through relay-transmitters while forming at least one multiple-hop pathway—ultimately to client-receivers.

The Use of Relayed Transmission Signals with Navigation Transmission Networks is More Likely when Using Virtual Timing Markers A relayed (or multiple-hop) transmission signal is a signal which takes more than a single-hop pathway from an originating transmitter to an ultimate corresponding receiver; that is, one or more intervening pathway nodes are involved. The greater use of relayed transmission signals or their benefits for navigation transmission networks is more likely when designers can (1) use virtual timing markers to indicate positions on signals which may have other intended waveforms over a same interval without overwriting each other, (2) use virtual timing markers to unintrusively share a timing signal as a tributary-or-relayed-signal to another transmission signal of almost any other same-or-different format, modulation, frequency, or who-can-talk-now protocol, (3) use virtual timing markers to share-or-piggyback upon, happenstance, other purpose transmission signals, which happen to be in the region, or (4) use virtual timing markers to initiate-or-trigger navigation timing marker instances, from originating constituent-or-non-constituent-happenstance transmitters, by relaying them through downstream nodes instead of using traditional non-relayed single-hop pathways and synchronized originating transmitters (which is discussed below).

Reducing-or-Eliminating Time Synchronization of Timing Marker Transmitters by Using Multiple-Hop Pathways Instead of Only Single-Hop Traditional navigation systems have two-or-more traditional transmitters "synchronize" their transmissions with respect to each other to send timing markers simultaneously or at known-or-determinable time-offsets. For example, using a world-wide universal time standard, overhead GPS spacecraft transmit time-synchronized physical timing markers on their GPS signals. Historically, GPS spacecraft require sub-microsecond time synchronization to achieve location determination with meter or millimeter precision.

Most traditional location-finding or navigation methods also use single-hop and synchronized transmissions. To be discussed further below, some "local wireless sensor networks" use a multitude of nodes with one-or-more having a known-determinable-estimated-or-statistically-derived location, but do not rely on instances of transit-times of originator-departing timing-markers-and-or-derivatives which completely travel through multiple-hop relay nodes to corresponding receivers.

Discussions further below include the notion of using multiple-hop (i.e., relayed) pathways from timing marker originating transmitters to corresponding receivers as a means to eliminate or reduce any need for any time synchronization across originating transmitters.

Trilateration Calculations

Trilateration is the more commonly used alternative, especially for GPS spacecraft to client receiver-locator applications. FIG. 1 demonstrates traditional trilateration in locating a client-receiver, $C_{Client\_receiver\_locator}$, relative to three Om originating timing marker transmitters on a 2-dimensional plane. The originating $O_1$, $O_2$, or $O_3$ transmitters transmit timing markers to $C_{Client\_receiver\_locator}$. Point $C_{Client\_receiver\_locator}$ simultaneously resides on the intersection of three rendered circles with (a) $O_1$, $O_2$, and $O_3$ as centers and (b) radius$_1$, radius$_2$, and radius$_3$ respectively as the timing marker transit time-intervals-or-distances. The only single possible location where $C_{Client\_receiver\_locator}$ can reside is on the intersection of the circles. For such radio transmissions, the radii-or-distances "distance$_m$" can be determined by multiplying the travel-or-transit time of timing markers from each originator $O_m$ to the receiver $C_{Client\_receiver\_locator}$ by c: distance$_m$=c $\Delta t_m$ where c is the velocity of the timing marker in the travel medium such as air or vacuum and $\Delta t_m$ is the transit time interval of timing marker travel from originator $O_m$ to the receiver $C_{Client\_receiver\_locator}$.

Similarly in a 3-dimensional space, when a target point $C_{Client\_receiver\_locator}$ is known to be distances radius$_1$, radius$_2$, radius$_3$, radius$_4$, ... radius$_m$ away from known location points $O_1$, $O_2$, $O_3$, $O_4$, ... $O_m$ of originator transmitters, respectively, it can be said that point $C_{Client\_receiver\_locator}$ simultaneously resides on the intersection of four or more spheres having $O_1$, $O_2$, $O_3$, $O_4$, ..., $O_m$ as centers and having those distances (distance$_1$, distance$_2$, distance$_3$, distance$_4$, ..., distance$_m$) as radii.

If the 3-dimensional space problem includes at least 4 timing marker originating transmitters and each originating transmitter can precisely time-tag departing timing markers based on the same absolute standardized time as the other originating transmitters with "time synchronized clocks", then spherical intersection equations to solve the 3-dimensional space problem can be formed. Many navigation implementations use very precise (e.g., microsecond, nanosecond, or picosecond) time synchronized transmitter clocks to time-tag timing marker departures. The transmitters must use the same standardized absolute time of day, so that their timing marker departures can be used to determine the time of travel of each timing marker to a user receiver locator.

Each transmitter clock bias (or error) away from any time standard can be determined; for multiple originator transmitter clocks, but the bias differences among them is assumed to be very small.

The receiver can also have a clock, but the receiver clock may be unsynchronized to the transmitters and thus have a "$t_b$" or "time offset b" different from the originating transmitter clocks. The receiver clock bias "$t_b$" or "time offset b" versus the same time standard can be determined by the traditional prior art calculations discussed below.

Geometric equations can take the form where,
i=indicates a specific transmitter i of n single-hop transmitters,
b=the time offset difference of (a) the receiver time to (b) the time of time-synchronized originating transmitter clocks,
c=the velocity of a radio signal or light in the medium such as air or vacuum,
$\rho^i$=$\rho_i$=the pseudorange distance from the transmitters to the receiver at location x, y, z as well as
$\tau^i$=the clock time of transmitter n
"$\tau^R$" or "$\tau$"=the receiver clock time which is equal to the originator-or-satellite-time minus b.

$$((x^1-x)^2+(y^1-y)^2+(z^1-z)^2)^{1/2}+c\tau-c\tau^1=\rho^1$$

$$((x^2-x)^2+(y^2-y)^2+(z^2-z)^2)^{1/2}+c\tau-c\tau^2=\rho^2$$

$$((x^3-x)^2+(y^3-y)^2+(z^3-z)^2)^{1/2}+c\tau-c\tau^3=\rho^3$$

$$((x^4-x)^2+(y^4-y)^2+(z^4-z)^2)^{1/2}+c\tau-c\tau^4=\rho^4$$

$$\ldots$$

$$((x^n-x)^2+(y^n-y)^2+(z^n-z)^2)^{1/2}+c\tau-c\tau^n=\rho^n$$

(re: "Global Positioning System", Wikipedia), (re: "Basics of the GPS Technique: Observation Equations", Geoffrey Blewitt, Department of Geomatics, University of Newcastle, Newcastle upon Tyne, NE1 7RU, United Kingdom, geoffrey.blewitt@ncl.ac.uk, 1997, page 15) (re: "Global Positioning System, Signals, Measurements, and Performance, $2^{nd}$ Edition", Pratap Misra and Per Enge, January 2011, Ganga-Jamuna Press, Lincoln, Mass., Chapter 6).

For the above, traditional methods assume that (1) errors caused by delays in traveling through the ionosphere or troposphere or (2) errors caused for other reasons are negligible.

When the transmitters (n=1 ... 4) have adequately time-synchronized clocks, $c\tau^1=c\tau^2=c\tau^3=c\tau^4$, thus "$\tau^R-\tau^n$" or "$\tau-\tau^n$" can be substituted with a constant b or $t_b$, so traditionally:

$$\sqrt{(x-x_i)^2+(y-y_i)^2+(z-z_i)^2}+bc=p_i, i=1,2,\ldots,n$$

When n is greater than 4, this system is overdetermined and "a fitting method" can be used such as least square computations to minimize errors.

When the originating $O_m$ transmitters are designated $O_m$, m=1, 2, 3, ... respectively, b=$t_b$, and point ($x_{client}$, $y_{client}$, $z_{client}$) represents the $C_{Client\_receiver\_locator}$—according to traditional trilateration methods and aforementioned assumptions, the spherical equations can become:

$$\sqrt{\begin{array}{l}(x_{Client}-x_{Originator,m=1})^2+\\(y_{Client}-y_{Originator,m=1})^2+\\(z_{Client}-z_{Originator,m=1})^2\end{array}}+t_bc=d_1=\text{distance}_1$$

$$\sqrt{\begin{array}{l}(x_{Client}-x_{Originator,m=2})^2+\\(y_{Client}-y_{Originator,m=2})^2+\\(z_{Client}-z_{Originator,m=2})^2\end{array}}+t_bc=d_2=\text{distance}_2$$

$$\sqrt{\begin{array}{l}(x_{Client}-x_{Originator,m=3})^2+\\(y_{Client}-y_{Originator,m=3})^2+\\(z_{Client}-z_{Originator,m=3})^2\end{array}}+t_bc=d_3=\text{distance}_3$$

$$\sqrt{\begin{array}{l}(x_{Client}-x_{Originator,m=4})^2+\\(y_{Client}-y_{Originator,m=4})^2+\\(z_{Client}-z_{Originator,m=4})^2\end{array}}+t_bc=d_4=\text{distance}_4$$

This yields 4 equations and 4 unknowns: $x_{client}$, $y_{client}$, $z_{client}$, and $t_b$ (the time offset difference between the client_receiver_locator clock and the synchronized $O_m$ originating transmitter clocks). There are factors which influence accuracy and precision such as (a) there can be more than 4 originating transmitters; (b) some originating transmitters may reside at a greater angle of view dispersion perceived by receiver $C_{Client\_receiver\_locator}$ and thus enable greater precision; or (c) some mathematical solutions which use approximations, convergence, or different goodness criteria and thresholds.

There are several theoretical and real-world practical approaches to determine the 4 or more unknowns (e.g. least-square error methods). Theoretical approaches often ignore many prevalent sources of error. When there are more than 4 traditional originator transmitters, the numerical solution can be "overdetermined" with a cluster of possible intersections. Least square error or other methods can be used to converge on a more precise intersection location.

PNT navigation or ranging parameters or vectors of client receiver locators or other participating transmission nodes under static or dynamic conditions can be determined by using a combination of one or more of the following: (a) traditional PNT navigation or ranging methods; (b) multiple-hop transmission configurations to lessen or eliminate the need to synchronize when transmitted timing markers depart; (c) virtual timing marker methods including one or more of: (i) unintrusively sharing or piggybacking timing markers on other purpose signals of the same or differing frequencies, modulations, channel capacities, encryptions, protocols, etc.; (ii) using position-independent and thus delay able virtual timing markers in the form of relocatable messages which will inherently always continue to indicate their precise targeted positions on a transmission signal despite any message relocation; and (iii) using virtual timing markers which can be encrypted, concealed, irregularly spaced, redundant, error-correctable, etc.; (d) additional non-constituent or constituent transmitter accommodations which can include (iv) using happenstance neighborhood non-constituent originator transmitters which may be funded and maintained by other organizations; (v) using any happenstance neighboring non-constituent relay transmitters which most likely are used for other purposes; and (vi) using constituent receiver locators which may be used to determine the locations of pertinent transmitters; and (e) "phantom virtual timing marker" methods, discussed in further detail below, to remap any sets of timing marker arrivals which straggle along a fast moving receiver's pathway.

The following methods, and inventions of the present disclosure are applicable to location, velocity, ranging, or other PNT determination implementations as well as other timing signal event handling techniques: (a) TOPIC #1 (also referred to as TOPIC #SZX0A): "Reducing or eliminating the need for time-synchronized originating-transmitter clocks" by using relayed or multiple-hop pathway configurations; (b) TOPIC #2 (also referred to as TOPIC #SZX0B): "Traditional trilateration and exploiting multiple-hop pathways and/or virtual timing marker methods"; (c) TOPIC #3 (also referred to as TOPIC #SZX0AC): "Traditional multilateration and exploiting multiple-hop pathways and/or virtual timing marker methods"; and (d) TOPIC #4 (also referred to as TOPIC #SZX0D): "Straggling timing marker arrivals on moving receiver pathways".

TOPIC #1 (Also Referred to as TOPIC #SZX0A): Reducing or Eliminating the Need for Time-Synchronized Originating-Transmitter Clocks by Using Relayed or Multiple-Hop Pathway Configurations Many traditional navigation systems require that 3, 4, or more widely dispersed transmitter platforms have clocks (1) which are synchronized with each other; or (2) which have long-term stable precisions such as approaching tens of nanoseconds or better (i) in order to minimize drifting of clocks from each other over several days or weeks; or (ii) because, for example, a 100-nanosecond GPS timing error could result in a location error of roughly 100 feet. This often suggests using onboard atomic clocks. While some recent atomic clocks may now be coin size and shock tested, they may not be implemented on particular classes of platforms for a variety of circumstantial, technical, or cost reasons. However, "single and multiple-hop" or "multiple-hop" transmission pathways, methods, and apparatus of the present disclosure can reduce or obviate the need for precisely synchronized clocks or similar mechanisms across the pertinent dispersed PNT multi-node system infrastructure.

Single or multiple-hop pathways for PNT or ranging determination require one or more transmitters to form timing marker pathways to the same corresponding receiver and knowledge or raw data pertaining to delays encountered at any intervening nodes.

Multiple-hop (or single-hop) pathways from the same originating transmitter have the same time of departure for any given timing marker. As such, when such a timing marker arrives at a corresponding receiver via two or more pathways, the originating departing time is always the same and thus does not require synchronization.

TOPIC #2 (Also Referred to as TOPIC #SZX0B): Traditional Trilateration and Exploiting Multiple-Hop Pathways and/or Virtual Timing Marker Methods Beyond the aforementioned traditional single hop pathway approaches which rely only on timing marker originating transmitter nodes and corresponding receiver nodes, "multiple-hop" or "single and multiple-hop" pathway methods and configurations add the options of other types of relay transmitter nodes or non-user/non-client receiver augmenting nodes (to help determine the precise location of upstream transmitters whose location is otherwise unknown or undeterminable).

Conditions or methods may include one or more of the following: (a) for any (originator or relay) transmitted signal the times of timing marker departures; and the corresponding platform locations at timing marker departures are known or can be determined; (b) timing marker originator or relay transmitter nodes that are stationary, slow moving, or fast moving; (c) any associated delays at relay transmitter nodes which are (i) measured, (ii) time-or-displacement-tagged, (iii) known or determinable, or (iv) ultimately made known where location-finding or PNT calculations are performed; (d) timing marker originator or relay transmitter nodes and their signals can be (i) constituents of the location or PNT support infrastructure, (ii) other onboard constituents which are primarily used for other purposes, or (iii) detached, happenstance, or other purpose non-constituents in the neighborhood; (e) determination of the locations of selected transmitters may include the use of constituent non-client receiver-locators (i) whose location at indicated timing marker arrivals is known or can be determined, and (ii) which minimally have a high or low, but adequate signal channel capacity to report raw data or derived findings to other transmitter, receiver, or other participant nodes; (f) client receiver locators the may be stationary, slow moving, but not necessarily fast moving; and (g) any transmissions carrying any referenced physical timing markers which require a high capacity (high resolution) channel whereas virtual timing marker transmissions, themselves, can use a low capacity channel for messages or heretofore adequate available spaces when sharing or piggybacking on another transmission signal.

Pertinent Originator, Relay, or Virtual Timing Marker Transmission Options

Beyond traditional single-hop trilateration, "multiple-hop" or "relayed transmissions" can use (a) additional relay transmitters between originator transmitters and client receiver-locators; (b) other constituent on-board transmitters; (c) happenstance or other purpose non-constituent transmitters in the neighborhood; or (d) virtual timing markers and methods to achieve additional features or benefits as discussed in further detail below.

Option 1—Introducing Relay Transmitter Nodes: Designers or implementers can substitute or add relay transmitter nodes (a) to obviate or reduce the need for originating transmitter clocks to time synchronize timing marker departures with other (timing marker) originator transmitter platforms and thus (b) reduce or eliminate the need for multiple-platform long-term-stability in precision clocks as well as periodic time-of-day updates and other time-maintenance activities.

Option 2—Delayed or Early Departure of Timing Markers—at originator-or-relay transmitters can be accommodated—by using virtual timing marker methods (a) when timing markers must be queued to singularly pass through a slow or low capacity transmission channel or (b) when technical circumstance or communications "who can talk now" protocol does not allow for the simultaneously overlapping of departing timing markers with other host transmission signal waveforms, other timing markers, or gaps in signals. Because virtual timing markers are formed into message formats, they are position independent and relocatable on a signal and, of course, they preserve their original indicated position on the signal.

Option 3—Sharing or Piggybacking Timing Markers on Other Purpose Transmissions by using virtual timing marker methods which enables them (a) to simultaneously overlap other signal waveforms or indicated positions of other timing markers because virtual timing markers as messages are position independent and relocatable, (b) to utilize other transmissions, radio frequencies, "who can talk now" protocols, geometries, etc., (c) to exploit the happenstance availability of other-neighborhood other-purpose constituent-or-non-constituent transmitters such as to "trigger" timing marker instances, or (d) to reduce constituent system infrastructure, staffing, costs, and maintenance.

Option 4—More Precision by Referencing Any Underlying Signal Carrier or Equivalent Waveforms: Traditionally, timing markers are formed by more common signal "encoded" events where each physical timing marker can comprise tens-hundreds-or-thousands of consecutive underlying carrier waveforms, for example, (i) finding a rise in the encoded signal to n percent of maximum value or (ii) the midpoint of a square wave plateau. But more precision can be obtained when virtual timing marker messages are used to reference timing markers defined by waveforms of the underlying signal carrier or carrier-less equivalents such as a unique sequence of high peaks, low peaks, or zero crossings of the carrier waveforms. Excessive processing or false positives can be eliminated or reduced by embedding commands to enable or disable searches for physical timing markers.

Option 5—Using Other Virtual Timing Marker Methods and Features: Improvements may include one or more of the following: (a) more frequent arriving timing markers at receivers or receiver-locators such as by (i) more timing marker originating transmitters which may or may not be time-synchronized with each other by adding more relay pathways from originating transmitters to receivers, (ii) more relay transmitters such as by piggybacking on constituent-or-non-constituent other purpose transmitters, (iii) having relay transmitters transmit additional intervening physical timing markers beyond those actually received, (iv) having relay transmitters transmit additional intervening virtual timing markers beyond those actually received, (b) jam or spoof resistance by encrypting virtual timing marker messages and adding authentication codes, sets of redundant multiple copies for each indicated position of a timing marker, sending virtual timing markers on a separate lower capacity channel, etc., (c) concealment of timing markers such as by irregularly spacing virtual timing marker messages for any periodic signal, (d) reduced need for multiplexing, additional radio frequencies, or higher capacity signal channels—by, instead, merging any tributary timing marker signals as virtual timing markers on one-or-fewer output signals.

Option 6—Using Other Non-Client or Non-User Receivers to locate one or more pertinent originator-or-relay transmitters of timing markers.

Transit Time Summation Equations with One-or-More Multiple-Hop Pathways

Figure 2:
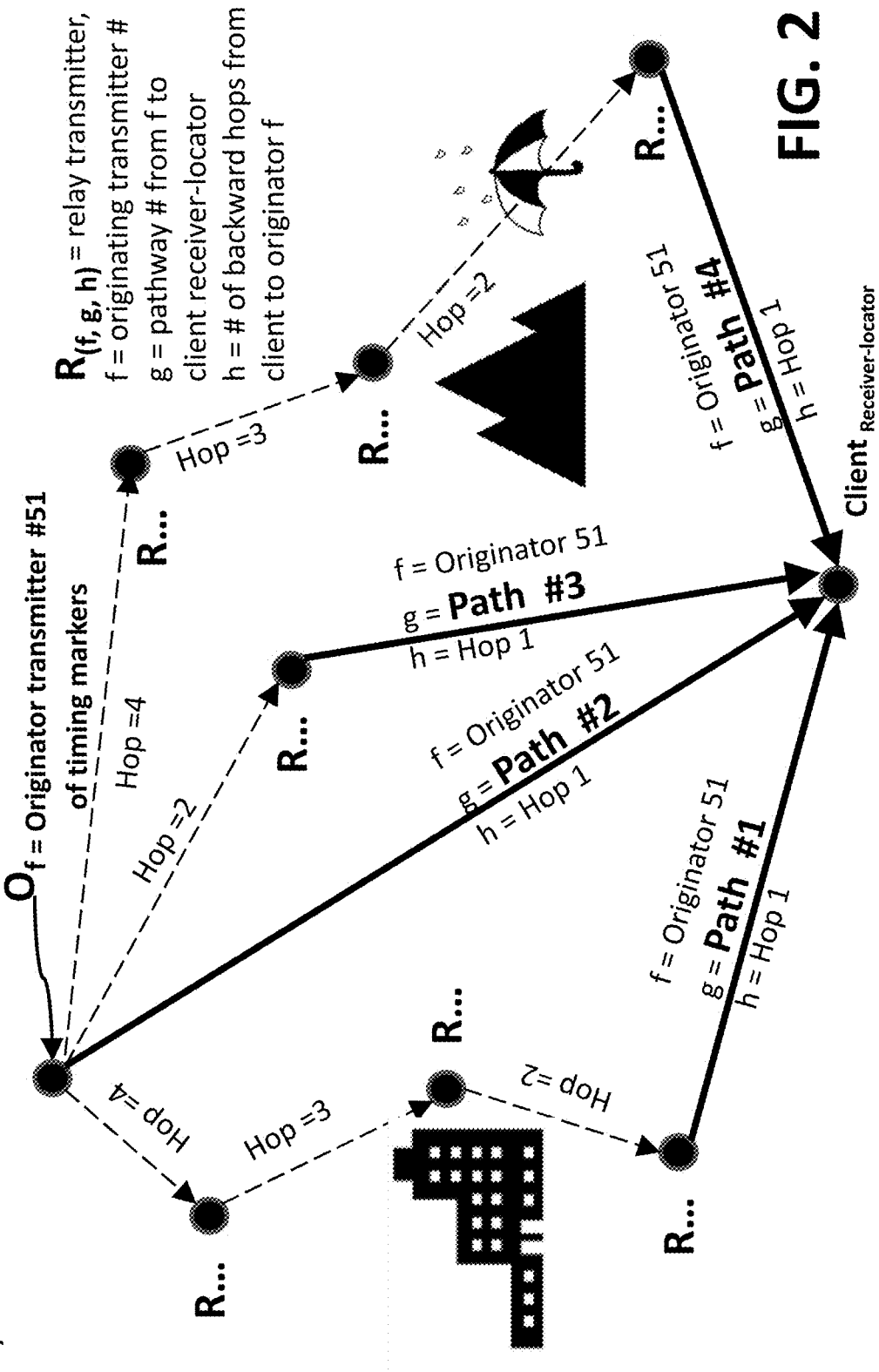
FIG. 2 illustrates "Finding a Client$_{Receiver-Locator}$ by Using 1 or More "$O_f$" Originator Transmitters, "$R_{(f, g, h)}$" Relay-Transmitters—with Hops Equal to 1 and Trilateration".

FIG. 2 shows how one originator transmitter #51, $O_{f=51}$, can propagate precision timing markers through zero-one-or-several $R_{(f,g,h)}$ relay transmitters ultimately to client receivers. While not shown, other $O_f$-type-originator transmitters can also simultaneously originate synchronized-or-unsynchronized timing markers which may use the same or other relay transmitters $R_{(f,g,h)}$. The notations "(f,g,h) or $R_{(f,g,h)}$" are used to designate-and-distinguish transmitter nodes, pathways, and hops—which can have different originating transmitters (f=the originating transmitter number), pathways (g=the pathway number from originator $O_f$ to a given client receiver-locator), and hops (h=the number of backward hops from the client receiver-locator to the originator $O_f$).

For trilateration calculation purposes, (1) final hop distances$_{f,g,h=1}$ (i.e., hop=1), (2) the precise locations of pertinent originating or relay transmitters at the instances of timing marker departures, and (3) corresponding times of indicated timing marker departures—are needed to determine the location of a $C_{Client\_receiver\_locator}$. For each originating transmitter $O_f$ timing marker departure instance, all $O_f$ pathways have the same beginning time of departure—from the originator node. As long as sufficient downstream timing marker times-of-departure and corresponding dispersed transmitter locations are known-or-determined for the final transmitter nodes which are one hop away from any given $C_{Client\_receiver\_locator}$, the final hop$_{f,g,h=1}$ travel time-intervals can be determined.

$$\sqrt{\begin{matrix}(x_{Client} - x_{Relay_{f=originator,g=path,h=hop=1}})^2 + \\ (y_{Client} - y_{Relay_{f=originator,g=path,h=hop=1}})^2 + \\ (z_{Client} - z_{Relay_{f=originator,g=path,h=hop=1}})^2\end{matrix}} + ct_b$$

and expanding the scope to resolve unknowns, the final-hop-distance$_{FinalHop=1}$ on path g also equals . . .

== ▶ vvvvvvvvvv (equals) vvvvvvvvvv final-hop-distance$_{FinalHop=1}$

= the summation of hop-distances$_m$ on path g minus preceding hop distances and (c ∗ delays at relay nodes)

== ▶ vvvvvvvvvv (equals) vvvvvvvvvv

-continued $= c$ (the total instance travel time on path $g$)

$- c$ (the sum of preceding $\Delta t$ transit time_intervals)

$- c$ (the sum of delays at relay nodes)

$== \blacktriangleright$ vvvvvvvvvv (equals) vvvvvvvvv $= c$ (the total instance travel time on path $g$)

$$- c \left( \begin{array}{c} \text{the } pathway_{Originator=f,Path=g} \\ \text{sum of } \Delta t \text{ preceding time\_intervals} \end{array} \right)$$

$$- c \left( \begin{array}{c} \text{the } pathway_{Originator=f,Path=g} \\ \text{sum of delays at } g \text{ relay nodes} \end{array} \right)$$

$== \blacktriangleright$ vvvvvvvvvv (equals) vvvvvvvvv $= c$ (the total instance travel time on path $g$)

$$- c \left( \begin{array}{c} \text{the sum of } \Delta t \text{ transit time\_intervals} \\ \text{between nonfinal } R_{n\_nodes} \text{ nodes} \\ \text{on the } O_f \text{ to client pathway} \end{array} \right)$$

$$- c \left( \begin{array}{c} \text{the sum of } \Delta t \text{ delay intervals at} \\ \text{nodes equal to measured} \\ \text{timing\_marker arrival times} \\ \text{at the nodes minus corresponding} \\ \text{relayed timing marker} \\ \text{departure times at the nodes} \end{array} \right)$$

$== \blacktriangleright$ vvvvvvvvvv (equals) vvvvvvvvv $$= c \left[ \begin{array}{c} \left( t_{Client_{receiver \cdot clock}} - time-of-day-arrival-of-timing-marker \right) - \\ \left( t_{Originator_f} - time-of-day-departure-of-timing-marker \right) \end{array} \right]$$

. . . results, for 3D problem spaces, in four or more such equations for unknowns ($x_{Client}$, $y_{Client}$, $z_{Client}$, and $t_b$), for the final hops to the $C_{Client\_receiver\_locator}$, on paths g, g+1, g+2, g+3, etc. . . . from Originator$_f$ or possibly additional other "Originator$_{f+\ldots}$" transmitters.

Potential Details of Operation with One-or-More Multiple-Hop Pathways and/or Virtual Timing Marker Methods For a timing marker instance or cycle iteration, an originating timing marker transmitter $O_f$ (or set of originating transmitters), transmits . . . "an originating or triggering" timing marker. Downstream, zero or more relay transmitters may (a) receive such timing markers, (b) time-tag their indicated arrival times, (c) possibly delay or pause a short period, (d) transmit corresponding timing markers, or (e) time-tag the precise indicated timing marker times of departure, any delay information, and any other pertinent information or timing marker history. A single timing marker transmission instance or cycle iteration consists of: (a) an originating transmitter (or set of originating transmitters) broadcasts a triggering timing marker (or set of triggering timing markers) to downstream relay transmitters, corresponding receivers, or receiver-locators (as well as any constituent receivers which are used to precisely locate selected originating or relay transmitters of unknown location) and (b) any relay nodes, which upon receiving a timing marker from a pertinent upstream node,—transmit (i) one-or-more corresponding timing markers, (ii) precise location information or raw location data for each instance of such departing timing markers, (iii) any delay or pause before relay transmission values, or (iv) associated timing marker multiple-hop history information.

Any constituent-type-receivers (i.e., non-client-receivers as part of the system apparatus) time-tag pertinent timing marker arrivals and forward raw or derived location information to pertinent location-or-PNT-determination-platforms Any corresponding client-or-user receiver-locators (i) receive such timing marker transmissions and corresponding timing marker histories from instance-originating-or-relay-transmitters or constituent-type-receivers, (ii) time-displacement-or-position tag their indicated arrivals using local or standardized time, and (iii) determine their location, velocity, or other PNT parameters.

When any delays at an originating transmitter occur before the corresponding timing marker is emitted and when timing marker times of departure are forwarded, any such originator delay values probably would not be necessary for location determination or PNT calculations.

Depending on the actual implementation, it is possible for delay periods to have negative values. For example, delay values can be negative when timing markers are transmitted early rather than on-time or delayed.

The transmitters insert, into their signals, either (i) virtual timing markers in the form of messages or (ii) physical timing marker waveforms such as zero-to-one transitions or signal phase change patterns—to precisely indicate points or events within the signal waveforms. The transmissions can append message information which can include: (1) specific event information associated with each timing marker, (2) the transmitter's precise location at timing marker departures or raw determination data, (3) the transmitter's precise time at indicated timing marker departure, (4) identification of the timing marker originator, pathway, or any timing reference signal, or (5) any other pertinent timing marker single-or-multiple-hop history.

Any corresponding receiver-locators precisely time-displacement-or-signal-position-tag indicated timing marker arrivals and perform operations to determine the location of the receiver-platform or other PNT parameters.

Traditional "dilution of precision" varies according to wide-or-more-narrow viewing angles: If some source transmitters are observed to have increased angles of view—such as having transmitters both overhead and on-the-horizon as opposed to only on-the-horizon—more precision can be obtained (a) by using transmitter combinations having only the greater angles of view or (b) by using algorithms which are weighted towards values derived using greater angles of view.

Additional constituent or non-constituent signal nodes can be used to better statistically or intelligently—(a) propagate and prioritize more pathways or (b) determine locations with more precise values.

While constituent signal nodes can have transmitters, which use pre-allocated equipment, transmission frequencies, protocols, and platforms,—other happenstance constituent-or-non-constituent transmission subsystems or platforms which are used for other purposes can also be used to provide additional timing markers, pathways, angles of approach, frequencies, etc. Virtual timing marker methods can also share or piggyback timing markers on other purpose transmissions.

Transmission nodes can forward (a) timing markers, (b) the corresponding locations of the transmitter and times at timing marker departures, (c) the corresponding carrier-cycle-and-fractional counts (or carrier-less equivalents), (d) velocity vectors, or (e) an updatable node or leg passage message history—for later usage (a) in setting up the correct topology or equation relationships or (b) to perform any timing accounting or equation computation functions.

Note: As mentioned earlier, when a receiver-locator is fast moving or when any relay transmitters introduce significant delays, arriving timing markers may appear to struggle on the receiver pathway and thus create inaccuracies. This can be reduced or eliminated by (a) adding more frequent incoming timing markers (e.g., at relay transmitters, by injecting additional outgoing physical or virtual timing markers), (b) selecting for computation only timing marker arrivals within a set which are close together, or (c) re-rendering straggling timing markers as "aligned timing marker coincident arrivals or orchestrated departures" as explained in later (e.g., realigned "phantom virtual timing marker arrivals" or equivalently orchestrated "phantom virtual timing marker departures").

Arrangement with One-or-More Multiple-Hop Pathways and/or Virtual Timing Marker Methods The arrangement, as in FIG. 2, comprises of a collection of constituent and optionally-non-constituent originating-or-relay transmitter platforms as well as corresponding receivers-or-receiver-locators. There may be one-or-more originating transmitters.

There must be sufficient dispersed transmission nodes. For 2-D layouts, three-or-more nodes must not line on the same point or line. For 3-D solutions, three, four, or more nodes must not lie on the same point, line, or plane.

Optionally there may be constituent non-client receiver platforms to help determine the location or other PNT information of originating or relay transmitter platforms.

For this embodiment, whenever the location of a receiver is to be determined, the receiver platform can be either stationary or slow moving. (Note: fast moving receivers can be addressed with traditional methods or other approaches which are presented in this document as well as virtual timing marker methods).

Originating or relay transmitters can be stationary, slow moving, or fast moving.

Steps of Operation

Operators should verify or calibrate the timing mechanisms on the platforms to a time standard, so (a) time intervals can be adequately, accurately, and precisely converted to corresponding standard distances or (b) one or more platform clocks can be better time-synchronized. Note: alternatively, a calibration distance can be used.

The system should repeat transmission instances or cycles as needed; each cycle includes the transmission of one-or-a-set of triggering, thus-originating, timing marker(s) along with each originator transmitter's precise time and corresponding location at time of indicated timing marker departure either (a) periodically, (b) individually, (c) arbitrarily, or (d) by pre-arranged absolute times of day with other originating transmitters. In the current embodiment, each originating timing marker instance may include transmitting timing markers (physical timing markers or virtual timing markers) to relay transmitters, receivers, or any corresponding receiver-locators.

Herein, each transmission cycle instance, can include relay transmitters to (1) wait to receive selected timing markers, (2) wait according to pre-arranged absolute times of day, (3) use two-way ranging methods to determine one or many node-to-node distances, or (4) broadcast or relay (a) corresponding identifiable timing markers, (b) timing marker ID's, (c) indicated timing marker arrival times, (d) indicated timing marker departure times, (e) the transmitter's precise locations at timing marker times of departure, (f) the lengths of any delay or pause between the arrival of an indicated timing marker and the platform's "relay" transmission of indicated timing marker time of departure, or (g) any additional timing marker travel, node, or hop history. The relay transmitters may be part of constituent-or-non-constituent platforms as well as share, piggyback, or otherwise use other purpose transmissions. The relay transmitters may broadcast or relay to other relay transmitters, receivers, or receiver-locators.

For (a) each selected transmission cycle or (b) collective set of transmission cycles from two or more originating transmitters,—any corresponding receiver-locator should (a) time-displacement-or-position tag the indicated positions of timing marker arrivals, (b) receive timing marker identification, (c) receive corresponding precise transmitter locations, pertinent node data, or hop histories, (d) receive any relay transmitter delay or pause durations information between indicated timing marker arrivals and any corresponding indicated timing marker departures, (e) receive any other pertinent information. Time-displacement-or-position tagging of the indicated positions of timing marker arrivals may use one or more of the following: (a) local precise time, (b) counters, (c) reference signal carrier-cycle-and-fractional counts or carrier-less equivalents, or (d) other similar methods. Time-tagging activities may also measure, determine, and use Doppler frequency shifts.

Pertinent Receiver-Locator Options

Pertinent receiver-locator subsystems may perform one or more of the following options.

Option #01: If some platform pathways are not in straight lines, use descriptions which enables intervening point determination or approximation of a platform's precise location along its pathway by using one or more of the following methods: (a) intervening periodic elapsed interval or displacement values between timing marker departures or arrivals, (b) geometric pathway equations, (c) tabular logs, (d) interpolation, or (e) extrapolation.

Option #02: Map, tabulate, sort, or index—selected recent indicated timing marker arrival sets according to originators, pathways, pathway-time-intervals, or local time of indicated timing marker arrivals.

Option #03: Perform signal delay distortion corrections which may or may not target particular smaller intervals or regions when appropriate and supporting data is available.

Option #04: Update, prioritize, or weigh-by-goodness-criteria records pertaining to (i) particular transmitters or (ii) neighborhood sources of error such as by multipath distortion, tropospheric effects, obstructions, or upstream transmitter platform.

Option #05: Form "transit time summation equations" of selected single-and-or-multiple-hop pathways, and thus calculate the time intervals of travel for specific individual timing markers which reach the receiver-locators. In particular this will include final hop legs of pathways to each pertinent receiver-locator or alternatively first-hop legs from any pertinent target transmitter.

Option #06: Perform the aforementioned final-leg (i) traditional trilateration, (ii) (traditional multilateration), (iii) single-and-multiple-hop trilateration, (iv) (single-and-multiple-hop multilateration), or (v) combinations thereof—by using pathway time intervals, delays, topologies, mappings, resulting summations, or other pertinent equations to determine the locations or other PNT values as needed. Optionally use weighting coefficients to selected terms of the equations to emphasize or reduce their contributions. Alternatively perform first-leg calculations for a pertinent target transmitter.

Option #07: Apply any needed or pertinent neighborhood signal distortion corrections to time intervals by using traditional methods.

Option #08: Convert any selected time intervals into corresponding distances.

Option #09: As appropriate, optionally (a) convert relative locations to absolute locations or (b) convert absolute locations into relative locations.

Option #10: Determine corresponding velocities by one-or-a-combination of one-or-more of the following: (a) using traditional methods, (b) subtracting differences in the (N−1), N, or intervening instances of location of a receiver-locator, (c) dividing distance intervals by the corresponding time intervals, or (d) using other methods herein.

Figure 3:
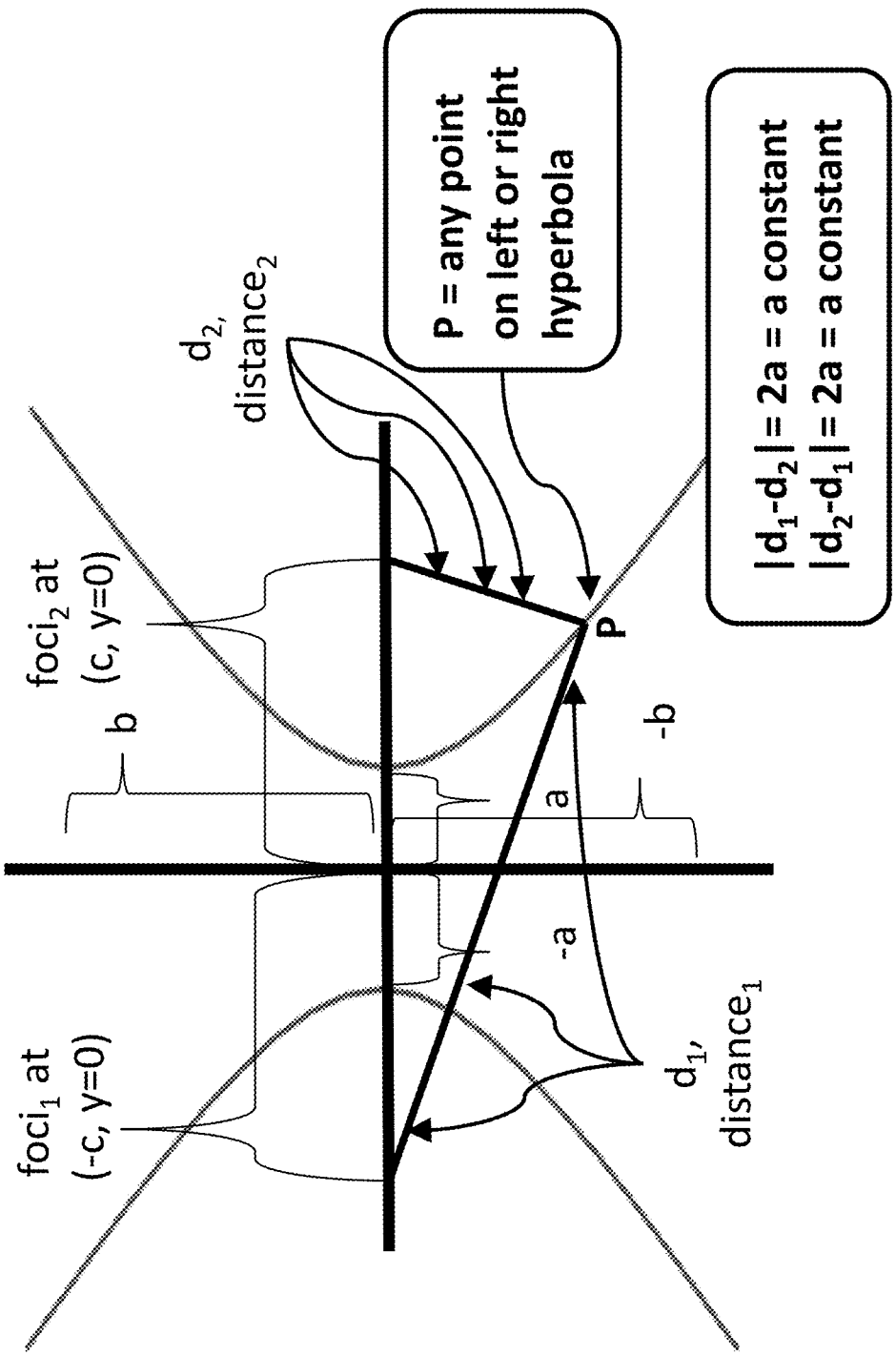
FIG. 3 shows a 'General review that the absolute differences of $|d_1-d_2|$ or "distance$_1$ minus distance$_2$," from any point P on a hyperbola are a constant 2a value'.

Option #11: Determine any other needed PNT parameters.
TOPIC #3 (Also Referred to as TOPIC #SZX0C): Traditional Multilateration and Exploiting Multiple-Hop Pathways and/or Virtual Timing Marker Methods
Background Review of Hyperbolas for 2-Dimensions and Hyperboloids for 3-Dimensions See FIG. 3: "General review that the absolute differences of $|d_1-d_2|$ or "distance$_1$ minus distance$_2$" from any point P on a hyperbola are a constant 2a value".

"A hyperbola may be defined as the locus of points ("x, y" or "P") where the absolute value of the DIFFERENCE OF THE DISTANCES to the hyperbola's two "foci" (i.e., foci$_1$ and foci$_2$) is a constant equal to 2a (i.e., distance$_1$−distance$_2$=2a, or distance$_2$−distance$_1$=2a), where 2a is the distance between its two hyperbola vertices."

"This (distance difference equals a constant) property accounts for many of the hyperbola's applications, such as MULTILATERATION; this is the problem of determining position from the DIFFERENCE IN ARRIVAL TIMES of SYNCHRONIZED signals, . . . " (re: paragraph "Multilateration" of "Hyperbolas" Wikipedia, www.wikipedia.org, Sep. 2, 2015).

"When the hyperbolas are horizontal and the foci are at (−c, 0) and at (0, c), let $d_1$ or distance$_1$ be the distance from the focus$_1$ at (−c,0) to a point P, at (x, y). The distance between the two points becomes, $$d_1 = \sqrt{(x-(-c))^2 + (y-0)^2}$$

$$= \sqrt{(x+c)^2 + y^2}$$

Similarly, $d_2$ can be the distance from the focus$_2$ at (c,0) to the point at (x,y), $$d_2 = \sqrt{(x-c)^2 + (y-0)^2}$$

$$= \sqrt{(x-c)^2 + y^2}$$

"We can use the fact that the vertices are on the hyperbola to find out what the difference of the distances is. If we take the vertex on the right, then $d_1$=c+a and $d_2$=c−a."

The difference of the distances becomes, $$d_1 - d_2 = (c+a) - (c-a) = c+a-c+a = 2a$$

(Reference: "Development of a Hyperbola from the Definition", https://people.richland.edu/james/lecture/m116/conics/hypdef.html, Richland Community College, Decatur, Ill., July 2015).

Given (a) any point P having coordinates (x, y) on the hyperbola (which has its two foci as $(x_1, y_1)$ and $(x_2, y_2)$ and (b) the mathematical properties associated with hyperbolas, the difference of distance$_2$ and distance$_1$ (e.g., distance$_2$−distance$_1$) can be generally written as:

$$\text{distance}_2 - \text{distance}_1 = 2a$$

or more generally, $$\sqrt{(x_2-x)^2 + (y_2-y)^2} - \sqrt{(x_1-x)^2 + (y_1-y)^2} = 2a$$

Background Review of Traditional Multilateration

Traditional multilateration methods make use of (1) TDOA (time difference of arrivals) of timing markers from different (time-synchronized) dispersed transmitters and (2) the geometry of resulting intersecting hyperbolas or hyperboloids (instead of trilateration using circles or spheres). Hyperbolas and hyperboloids best represent mathematical relationships when displaying all possibilities which could generate a given time difference of arrival value.

Multilateration can be used in the location determination of a transmission node for cases of either (a) a single UNKNOWN position TRANSMITTER sending timing markers to three-four-or-more known-or-determinable position receivers or (b) a single UNKNOWN position RECEIVER-LOCATOR receiving timing markers from three-four-or-more known-or-determinable position transmitters.

For receiver-locator position determination, traditional multilateration steps include (a) measuring TDOA (time differences of arrival or similar displacements) of instance sets of transmitted timing markers from multiple dispersed transmitters of precisely known locations and precisely synchronized transmitter clocks as well as (b) receiving the transmitter times of indicated timing marker departures, and (c) performing time differences of arrival calculations based on the geometry of intersecting hyperbolas or hyperboloids.

"Errors in the measurement of the time of arrival of pulses mean that enhanced accuracy can be obtained with more than three or four receivers. In general, N receivers provide N−1 hyperboloids. When there are more than the three or four receivers, the N−1 hyperboloids should, assuming a perfect model and measurements, intersect on a single point. In reality, the surfaces rarely intersect, because of various errors. In this case, the location problem can be posed as an optimization problem and solved using, for example, a least squares method or an extended Kalman filter. Additionally, the TDOA's of multiple transmitters can be averaged to improve accuracy." (re: "Multilateration", www.wiki.gis.com, August 2015).

Traditional Multilateration to Determine the Location of a Receiver Needs Three or More Time-Synchronized Transmitters at Known Locations.

The receiver-locator measures the TDOA time-difference-of-arrivals of sets of timing markers which are sent from three or more synchronized transmitters from known locations. The time differences can be used to construct and numerically solve hyperbolic equations which intersect and result in the determination of the receiver-locator position.

Various implementations can include (a) timing markers which are broadcast on the same frequency, SOMETIMES WITH KNOWN DELAYS BETWEEN TRANSMISSION TIMES, (b) signals on different frequencies, or (c) using CDMA (code division multiple access) to simultaneously share signals on the same frequency.

TRADITIONAL MULTILATERATION TO DETERMINE THE LOCATION OF A TRANSMITTER NODE: does not necessarily require the transmitter node to have a synchronized transmitter clock, but three, four, or more receiver nodes having precisely known locations must precisely measure and determine the TDOA time difference of arrivals of timing markers sent from the transmitter node. Again, TDOA time difference of arrivals of timing marker measurements can be used to create and solve intersecting hyperbolic equations for the determination of the transmitter location.

Figure 4:
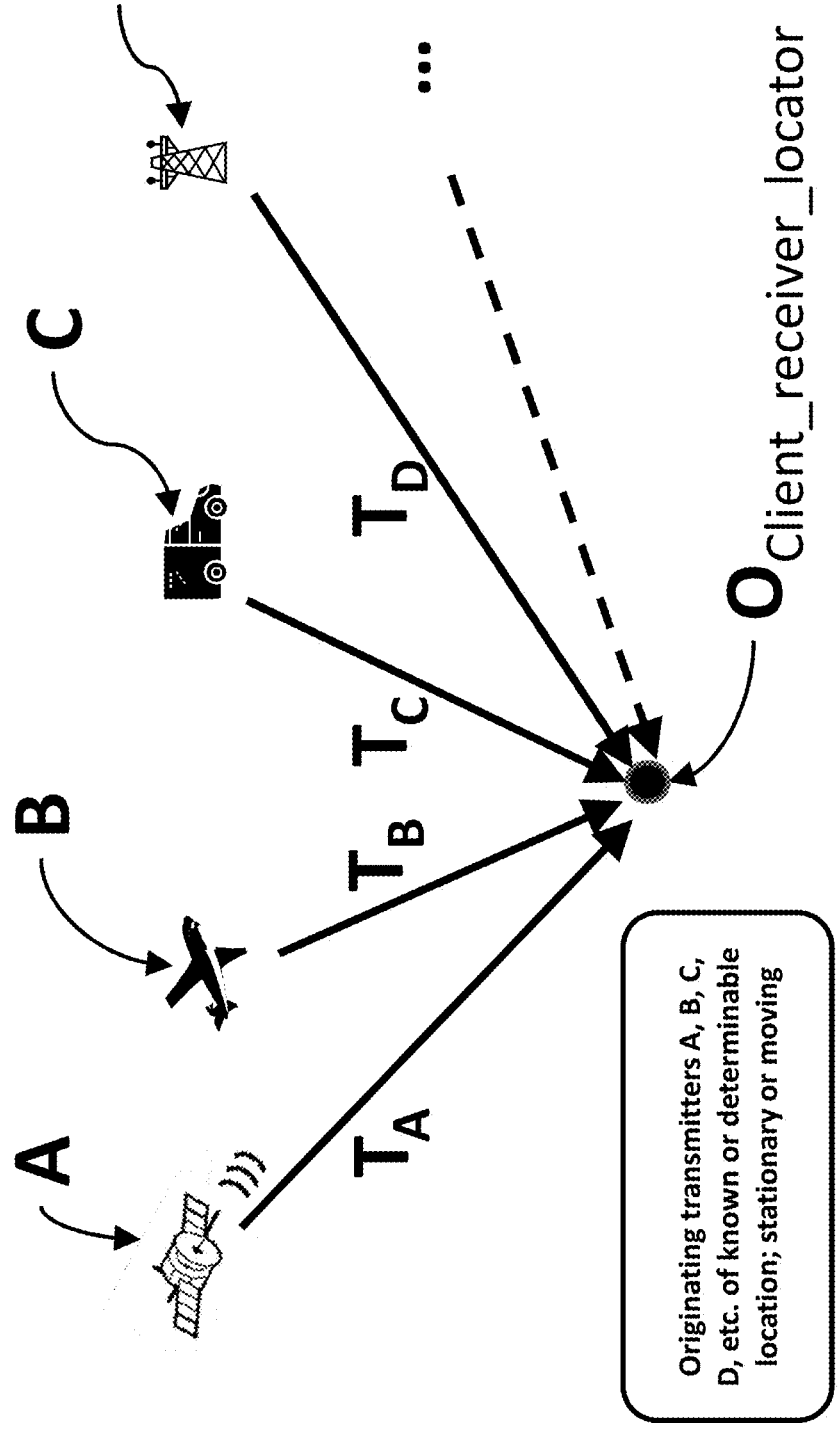
FIG. 4 shows "Traditional multilateration with multiple transmitters A, B, C, D, etc. sending single-hop timing markers to a Client_receiver_locator".

Traditional Multilateration to Determine the Unknown Location of a Receiver Node FIG. 4 shows traditional multilateration with multiple sending single-hop timing markers to a Client_receiver_locator. In the illustration, m=uniquely identifies different transmitters A, B, C, D, etc., to a "Client_receiver_locator" (designated with coordinates—$x_{Client\_receiver\_locator}$, $y_{Client\_receiver\_locator}$, $z_{Client\_receiver\_locator}$) and by using preceding equations above, each transmitted timing marker travel or transit $T_m$ time from a transmitter is the travel distance divided by c, the velocity of the timing marker in the neighborhood medium such as air is:

$$T_A = \frac{1}{c}\sqrt{\begin{array}{l}(x_{Client\_receiver\_locator} - x_A)^2 + \\ (y_{Client\_receiver\_locator} - y_A)^2 + \\ (z_{Client\_receiver\_locator} - z_A)^2\end{array}}$$

$$T_B = \frac{1}{c}\sqrt{\begin{array}{l}(x_{Client\_receiver\_locator} - x_B)^2 + \\ (y_{Client\_receiver\_locator} - y_B)^2 + \\ (z_{Client\_receiver\_locator} - z_B)^2\end{array}}$$

$$T_C = \frac{1}{c}\sqrt{\begin{array}{l}(x_{Client\_receiver\_locator} - x_C)^2 + \\ (y_{Client\_receiver\_locator} - y_C)^2 + \\ (z_{Client\_receiver\_locator} - z_C)^2\end{array}}$$

$$T_D = \frac{1}{c}\sqrt{\begin{array}{l}(x_{Client\_receiver\_locator} - x_D)^2 + \\ (y_{Client\_receiver\_locator} - y_D)^2 + \\ (z_{Client\_receiver\_locator} - z_D)^2\end{array}}$$

When transmitter A is used as the point of origin for the coordinate system, TA becomes $$T_A = \frac{1}{c}\sqrt{\begin{array}{l}(x_{Client\_receiver\_locator})^2 + \\ (y_{Client\_receiver\_locator})^2 + \\ (z_{Client\_receiver\_locator})^2\end{array}}$$

Then the measured time differences of arrival $T_2-T_1$ between pairs of timing markers at the Client_receiver_locator ($x_{Client\_receiver\_locator}$, $y_{Client\_receiver\_locator}$, $z_{Client\_receiver\_locator}$) could be written as:

$$T_B - T_A = \frac{1}{c}\left(\sqrt{\begin{array}{l}(x_{Client receiver_{locator}} - x_B)^2 + \\ (y_{Client receiver_{locator}} - y_B)^2 + - \\ (z_{Client receiver_{locator}} - z_B)^2\end{array}} \sqrt{\begin{array}{l}(x_{Client\_receiver\_locator})^2 + \\ (y_{Client\_receiver\_locator})^2 + \\ (z_{Client\_receiver\_locator})^2\end{array}}\right)$$

$$T_C - T_A = \frac{1}{c}\left(\sqrt{\begin{array}{l}(x_{Client receiver_{locator}} - x_C)^2 + \\ (y_{Client receiver_{locator}} - y_C)^2 + - \\ (z_{Client receiver_{locator}} - z_C)^2\end{array}} \sqrt{\begin{array}{l}(x_{Client\_receiver\_locator})^2 + \\ (y_{Client\_receiver\_locator})^2 + \\ (z_{Client\_receiver\_locator})^2\end{array}}\right)$$

$$T_D - T_A = \frac{1}{c}\left(\sqrt{\begin{array}{l}(x_{Client receiver_{locator}} - x_D)^2 + \\ (y_{Client receiver_{locator}} - y_D)^2 + - \\ (z_{Client receiver_{locator}} - z_D)^2\end{array}} \sqrt{\begin{array}{l}(x_{Client\_receiver\_locator})^2 + \\ (y_{Client\_receiver\_locator})^2 + \\ (z_{Client\_receiver\_locator})^2\end{array}}\right)$$

Each equation describes a separate hyperboloid, and the intersection of the hyperboloids yields the x-y-z location of the Client_receiver_locator. The above also have the previously mentioned relationships:

$$d_2 - d_1 = 2a$$

$$\sqrt{(x_2 - x)^2 + (y_2 - y)^2} - \sqrt{(x_1 - x)^2 + (y_1 - y)^2} = 2a$$

There are 3 equations with 3 unknowns: $x_{Client\_receiver\_locator}$, $y_{Client\_receiver\_locator}$, $z_{Client\_receiver\_locator}$. Traditional multilateration approaches can also accommodate more transmitter nodes, local networks of transmitters, or moving nodes.

Multilateration with One-or-More Multiple-Hop Pathways to Determine the Location of a Client Receiver-Locator Node Like the aforementioned modification to the traditional trilateration approach, using multiple-hop pathways only adds (a) measured time intervals or (b) delays-at-relay transmitters—to the multilateration equations which focus on final timing marker hops which reach the Client_receiver_locator such as:

An earlier multilateration equation:

$$T_B - T_A = \frac{1}{c}\left(\sqrt{\begin{array}{l}(x_{Client receiver_{locator}} - x_B)^2 + \\ (y_{Client receiver_{locator}} - y_B)^2 + - \\ (z_{Client receiver_{locator}} - z_B)^2\end{array}} \sqrt{\begin{array}{l}(x_{Client\_receiver\_locator} - x_A)^2 + \\ (y_{Client\_receiver\_locator} - y_A)^2 + \\ (z_{Client\_receiver\_locator} - z_A)^2\end{array}}\right)$$

becomes:

$$T_B - T_A = \left(\begin{array}{c}\text{summation of time interval hops} \\ \text{along the path from } B \\ \text{before the final transmitter node hop}\end{array}\right) +$$

$$\left(\begin{array}{c}\text{summation of delays} \\ \text{along the path from } B \\ \text{at any relay nodes}\end{array}\right) + \frac{1}{c}\left(\sqrt{\begin{array}{l}(x_{Client\_receiver\_locator} - x_{B\_Final})^2 + \\ (y_{Client\_receiver\_locator} - y_{B\_Final})^2 + \\ (z_{Client\_receiver\_locator} - z_{B\_Final})^2\end{array}}\right) -$$

$$\left(\begin{array}{c}\text{summation of time interval hops} \\ \text{along the path from } A \\ \text{before the final transmitter node hop}\end{array}\right) -$$

$$\begin{pmatrix} \text{summation of delays} \\ \text{along the path from } A \\ \text{at any relay nodes} \end{pmatrix} - \frac{1}{c} \sqrt{\begin{aligned} &(x_{Client\_receiver\_locator} - x_{A\_Final})^2 + \\ &(y_{Client\_receiver\_locator} - y_{A\_Final})^2 + \\ &(z_{Client\_receiver\_locator} - z_{A\_Final})^2 \end{aligned}}$$

where $(x_{A\_Final}, y_{A\_Final}, z_{A\_Final})$ and $(x_{B\_Final}, y_{B\_Final}, z_{B\_Final})$ are the originator or relay transmitter locations for the final hops to the Client_receiver_locator.

Similarly, for the other originating transmitter nodes $T_x$, difference equations can be written for:

$$T_C - T_A$$

$$T_D - T_A$$

The single-and-multiple-hop multilateration system must similarly solve for the client receiver location (x, y, z) with respect to the coordinate system—and the only differences are (1) possible additional hops before the final hops and (2) measured intervals or delays.

The potential details of operation can reference a configuration such as FIG. 2 or the previous single-and-multiple-hop trilateration embodiment—except that calculations can use multilateration equations for the final hops at a target receiver or receiver-locator. The details of operation are like of the previous single-and-multiple-hop trilateration embodiment except that when mapping of nodes and pathways and when determining a location or other PNT parameters, —trilateration, multilateration, or other methods may be used for final hops to particular target receivers or receiver-locators.

Client-receiver-locators time-displacement-or-position tag the indicated timing marker arrivals. If a location-determination algorithm uses TDOA time difference of arrival methods, the receiver-locator may determine time-difference of indicated arrivals of timing markers which used different pathways for the same or differing originator timing marker instances. Onboard subsystems can use onboard clocks or timing signals from standard time sources for measuring time intervals which may correspond to standardized time to compute standardized distances, but they are not necessarily tied to a standardized absolute time of day. Onboard subsystems can (a) make timing marker delay distortion corrections or (b) alternatively count carrier cycles or carrier-less equivalents between timing markers to determine TDOA. Onboard subsystems can also use precise time sources or precise calibration-distances for precise measurements.

Determining any pertinent indicated timing marker time differences of arrival by way of single-or-multiple-hop pathways to reach any client-receiver-locator or constituent receiver can be addressed by (a) identifying and summing complete originator-to-receiver pathways of timing marker intervals and delays and (b) ultimately isolating the final leg interval pathways surrounding the client-receiver-locator or constituent receiver (herein, "hop #equals 1" or "h=hop=1" indicates the time interval where the counting convention begins by counting intervals BACKWARD or away from the client-receiver).

Virtual timing marker methods may be similarly and simultaneously applied using either or both the actions in the aforementioned trilateration options or externally referenced virtual timing marker documents.

Multilateration to determine the location of a target transmitter relative to 3-or-4 receivers of known location can be similarly solved.

TOPIC #4 (Also Referred to as TOPIC #SZX0D): Straggling Timing Marker Arrivals on Moving Receiver Pathways Straggling of arriving timing markers along a MOVING receiver platform's pathway may occur when using (a) fast-moving transmission receivers or (b) slow-or-fast moving transmission receivers when significant delays occur at one or more upstream transmitter nodes before transmitting or relaying timing markers.

This embodiment serves as a collective example to (a) reduce error caused by possible straggling of indicated timing marker arrivals, (b) create or render more useable timing marker arrivals on moving receiver pathways, (c) more precisely log, render, interpret, or calculate intervening-or-interpolated pathway arrival time intervals at receivers, or (d) thus enable better determination of location or other PNT parameters of a moving receiver. This can also similarly-or-equivalently be applied to cases with a subject fast moving transmitter platform of unknown location or other PNT parameters.

This embodiment can use one or more of the following methods: (a) using intervening timing epochs between pairs of (i) formal indicated timing marker departures or (ii) corresponding indicated arrivals, (b) interpolating or extrapolating to realign timing markers as either: (i) coinciding "phantom-virtual-timing-marker arrivals" as single indicated arrival points on the pertinent moving receiver pathway or (ii) equivalent orchestrated indicated "phantom-virtual-timing-marker departures" of timing markers from upstream transmitters, (c) using single-hop, single-and-multiple-hop, or multiple-hop transmission pathways to a receiver, (d) delayed-or-earlier departing of timing markers (with respect to other participating transmitting platforms) from two-or-more different transmitter platform whose respective locales are significantly farther-AND-closer—to a same selected corresponding receiver platform locale, or (e) using virtual timing marker methods.

This applies to situations of one-or-more signals from one-or-more transmitters having (i) departing timing markers and/or (ii) intervening timing waveforms: a) Case 1: departing at irregular-or-varying-intervals, (b) Case 2: departing at equal time intervals which are thus simply mathematically describable, (c) Case 3: departing at uniformly widening (or shortening) time intervals and thus are simply mathematically describable, or (d) Case 4: departing at intervening time intervals which are describable by using other mathematical expressions.

Variable Delays or Pauses at Transmitters

Figure 5:
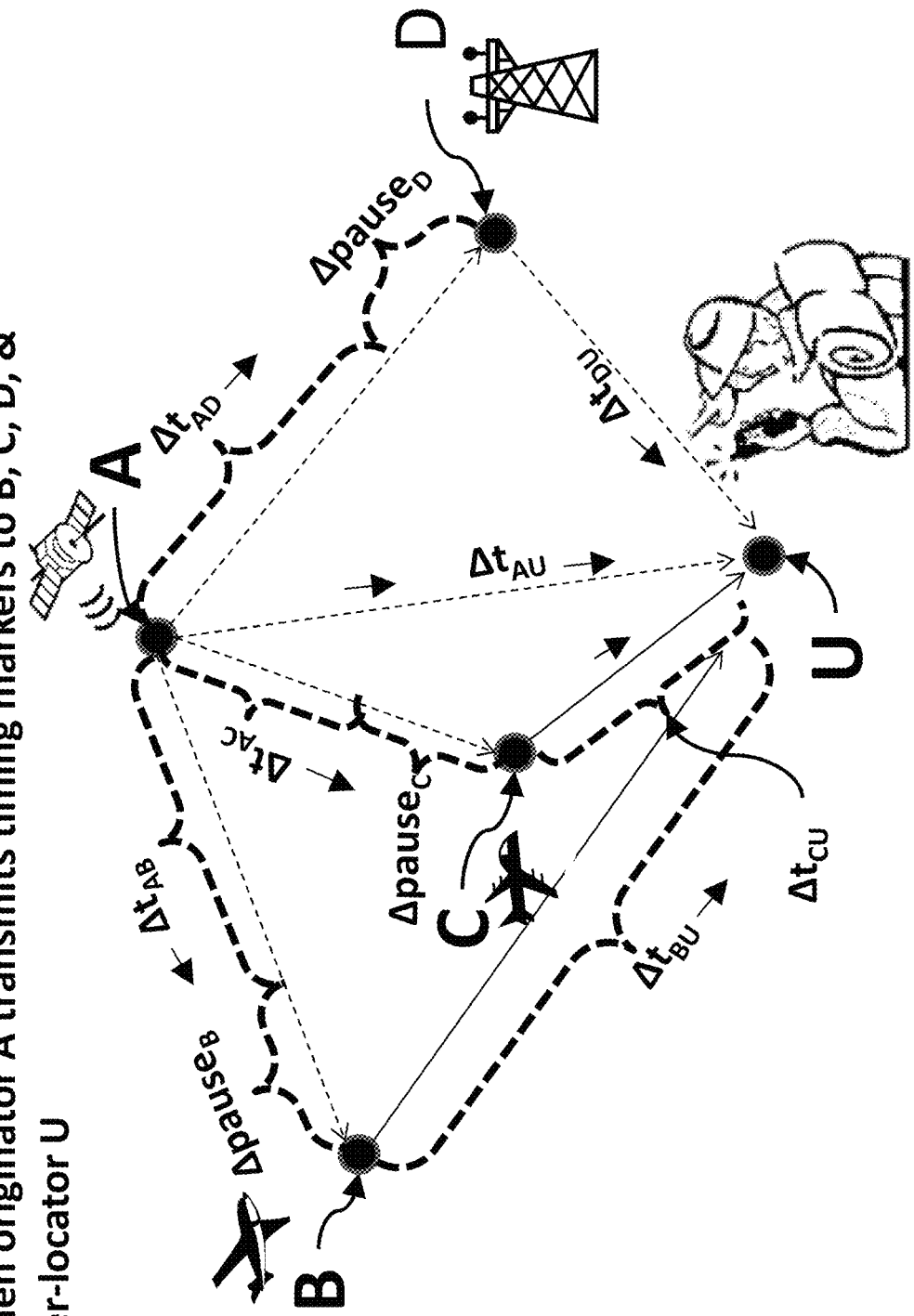
FIG. 5 shows "Time interval mapping with known pauses at relay nodes B, C, & D when originator A transmits timing markers to B, C, D, & receiver-locator U".

A navigation broadcast system could have significant variable pauses or delays at transmitter nodes because of (a) electronic circuitry or varying-or-random-event processor overhead, (b) inadequate time synchronization or lapses across platform clocks, or (c) a signal protocol where a transmitter must wait for a turn to transmit on a channel. Herein, variable wait times will sometimes be referred to as "$\Delta pause_x$" delays. FIG. 5 shows how additional "$\Delta pause_x$" delays might be diagrammed in a topological mapping of time intervals when an originator transmitter A transmits originating timing markers to relay transmitters B, C, and D as well as a corresponding receiver-locator U.

A condition for methods herein is that any such pauses or delays must be adequately and precisely time-displacement-or-signal-position-tagged, measured, known, or determinable—for the type of location determination which is to be performed for the given dataset instance. In most cases, tagging or measurements must be made both at relevant transmitters and corresponding receivers.

Methods for Addressing Straggled Timing Marker Arrivals

When signal timing markers may straggle as they arrive at receiver-locators, traditional or alternative methods may be used such as combinations of one or more of the following:

Option #01: sometimes ignoring the straggling—such as (i) when the pertinent receivers are stationary or adequately slow moving or (ii) when low enough precision is required.

Option #02: Traditional velocity methods or hardware which include: a) Measuring and averaging successive changes in location readings against corresponding changes in time, b) Measuring Doppler shifts in received signal frequencies due to platform movement, c) (FDOA "frequency difference of arrival" methods), d) Kalman filtering for improving real-time estimations, e) Inertial navigation systems, accelerometers, radar, etc., or f) Of course, more precise overall transmitter synchronization—such as (1) onboard atomic clocks to an even more precise world time standard or (2) ground atomic clocks which are used to synchronize spacecraft transmitters (e.g., Japan's Quasi-Zenith Satellite System), g) Synchronizing receiver clocks to transmitter clocks, h) More frequent (physical) timing markers, or i) Having the pertinent transmitter platforms provide velocity vectors along with the timing markers (i.e. Note that some transmitters, like GPS spacecraft, do not).

Option #03: Traditionally minimizing any pause durations either a) By design or implementation or b) Since a physical timing marker can be a short interval which only needs to be a waveform change, it may be possible to insert them with little delay amongst other data.

Option #04: TRADITIONALLY OR ALTERNATIVELY not having pauses at all by (a) enabling simultaneous broadcasts by using sharable channel modulations such as CDMA which GPS uses or (b) by using separate dedicated radio channels which can have continuous broadcasts but unfortunately can also prevent use of any of the radio channels by others either who want to use radio frequencies at-or-near the radio channels and are physically nearby.

Option #05: Alternatively adjusting any departure times or pause durations to more closely align 3, 4, or more timing marker arrivals for particular receiver regions—regarding (a) the timing marker departure times from originators or (b) delays at relay nodes—for each dataset instance with the expectation that the straggling will be reduced for trilateration or similar calculations. A PNT positioning-navigation-timing-ranging-or-beacon transmission system apparatus can reduce straggling of selected indicated arrivals of timing markers on the pathways of one-or-more moving corresponding receivers which occupy particular selected regions-or-locales—by correspondingly adjusting-advancing-or-delaying one-or-more indicated physical timing marker departure times from one-or-more timing marker originator-or-relay transmitters with either or both (a) earlier departure times for transmitters-or-relay transmitters which are relatively farther than from other participating transmitters or (b) later departure times for transmitters-or-relay-transmitters which are relatively closer than other participating transmitters—to a same corresponding receiver-or-receiver-locale. Note that it takes about "0.073 seconds" for a timing marker to travel from a GPS spacecraft to earth, so some applications might consider—correspondingly delaying any local land-based pseudo-satellite (also called "pseudolites") timing marker transmissions by that much.

Option #06: Traditionally or alternatively increasing the number of timing markers arriving at moving receivers by: (a) Increasing the number of timing marker transmissions or rate from originator or relay nodes, (b) Having any relay nodes transmit more frequent timing markers for each timing marker received from upstream nodes (e.g., inserting more virtual timing markers), (c) Having more originator or relay nodes—a. Using surrounding third-party video, data, or other communications links with identifiable (i) intrinsic or (ii) implanted—timing markers on high capacity rate or high frequency carriers for (1) triggering of relay transmitters or (2) providing reference timing signals for virtual timing markers.

Option #07: Alternatively, piggybacking "virtual timing markers" on other purpose transmissions and thus further propagating or proliferating them.

Option #08: Traditionally or alternatively using two-way transmission ranging when such opportunities become available and concealment of such nodes may or may not be important. Note: This can include (a) piggybacking virtual timing markers on normal or other purpose transmissions or (b) using virtual timing marker methods to encrypt or conceal virtual timing markers.

Option #09: Traditionally using other ranging or PNT determination methods such as RSS received signal strength or RRSS relative received signal strength. Usually this is not adequate when millimeter precisions are required.

Option #10: Traditionally or alternatively making pauses irrelevant by making use of other prevalent or prolific transmissions in the neighborhood—especially by using some as originating transmitters or by using virtual timing marker methods.

Option #11: Alternatively using virtual timing markers to eliminate or reduce some-or-all delays.

Option #12: Traditional trilateration or similar methods.

Option #13: Alternatively using location, velocity, or other PNT determination methods herein by using one or more of the following: (a) single-and-multiple-hop or multiple-hop timing marker pathways, (b) remapping timing markers into coincident phantom virtual arrivals of timing markers which converge at a single target point on a moving receiver's pathway, or (c) remapping into realigned, orchestrated phantom-virtual-timing-marker departures.

PART 1 OF TOPIC #SZX0D—a Description of the Setting or Arrangement

When using a set of transmission timing markers to form perfect transit-distance spheres for precise and accurate trilateration,—their single-or-FINAL-HOP timing marker arrivals should adequately coincide or intersect ideally at the same point on the pathway of a receiver-locator.

Figure 6:
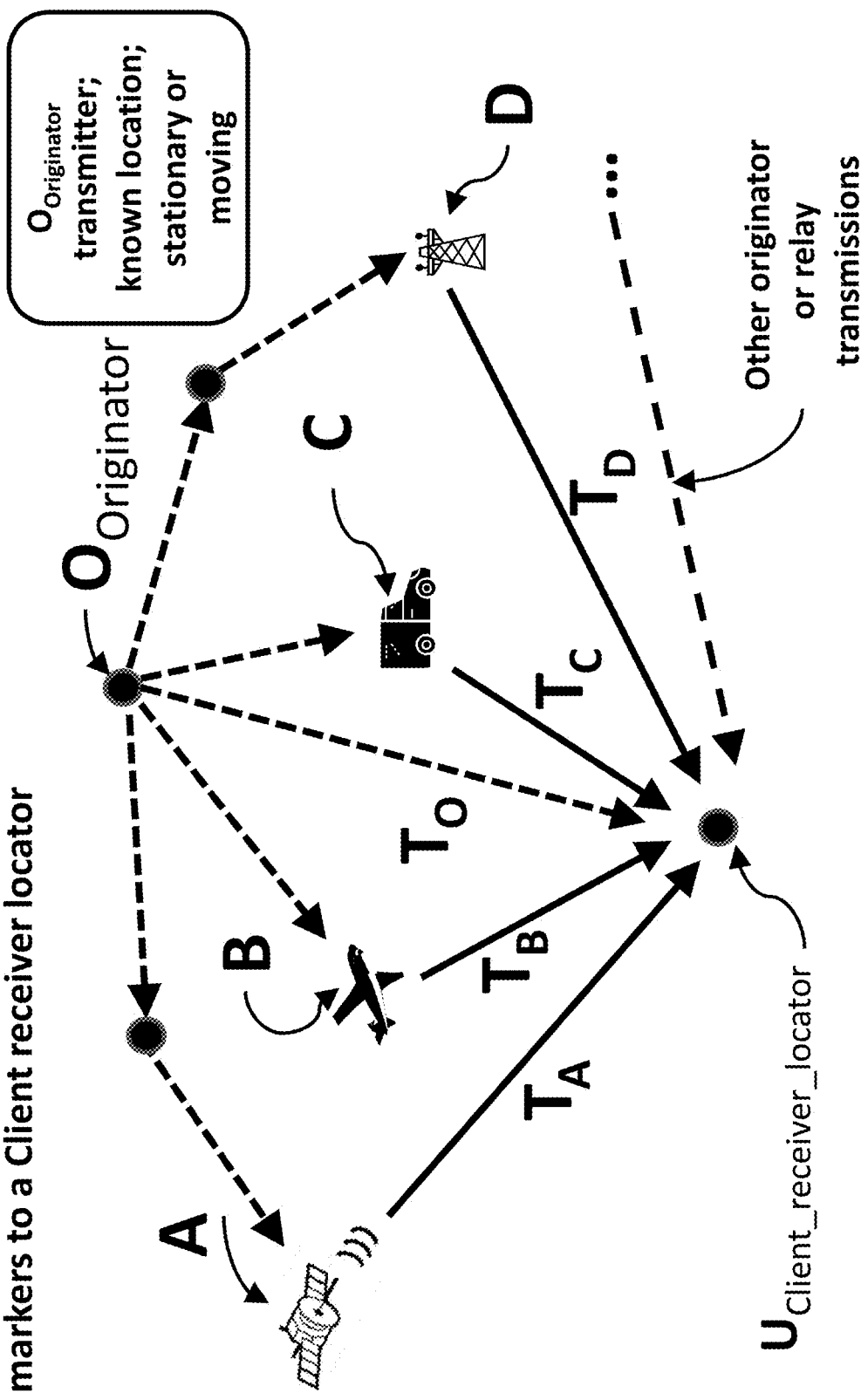
FIG. 6 shows "Single-and-multiple-hop trilateration or multilateration with transmitters O originating and (A, B, C, D, etc.) relaying—timing markers to a Client_receiver locator".
Figure 7:
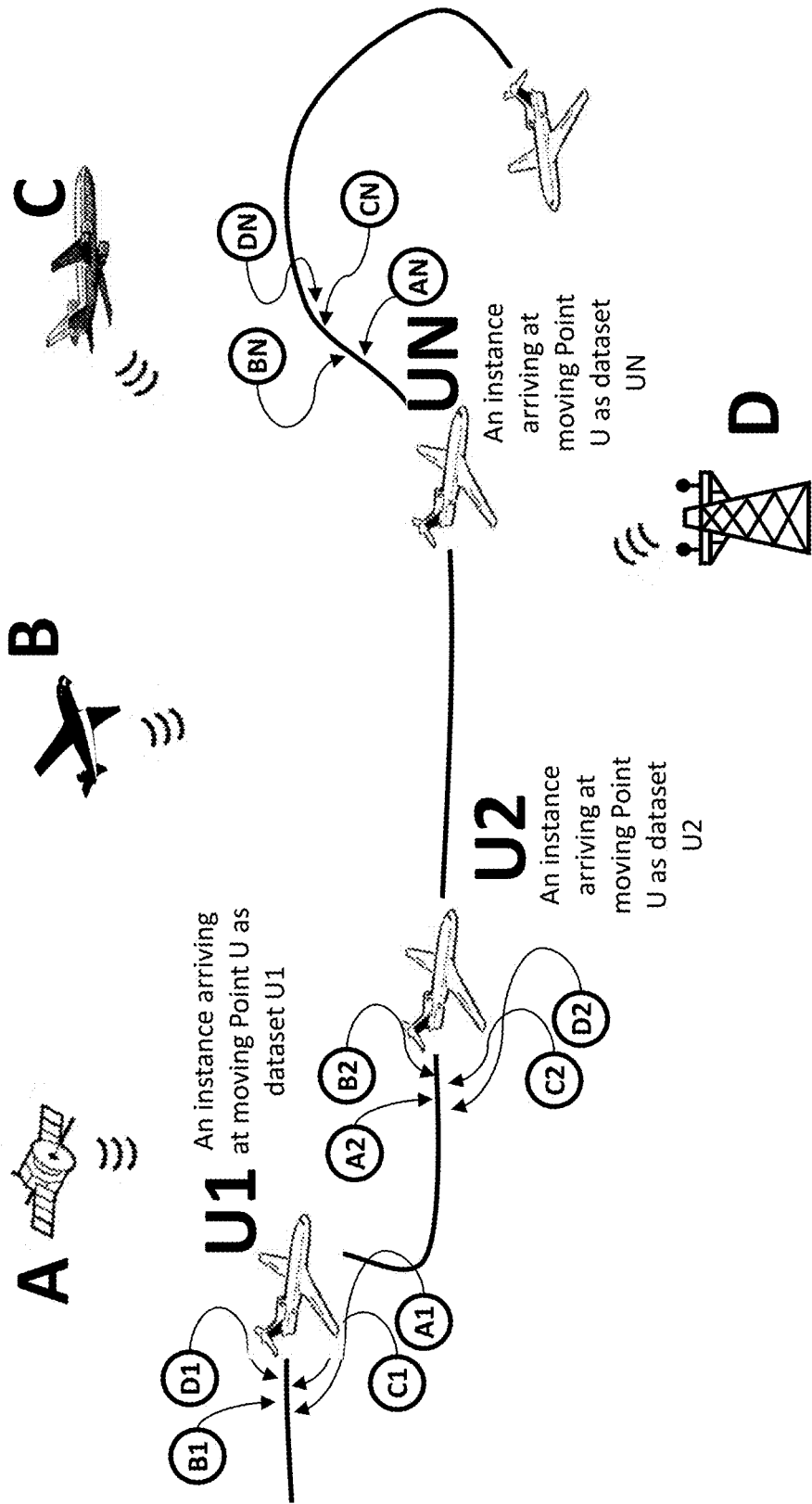
FIG. 7 shows "Successive instances of datasets arriving at moving receiver U as straggled timing marker arrivals on U's pathway".
Figure 10:
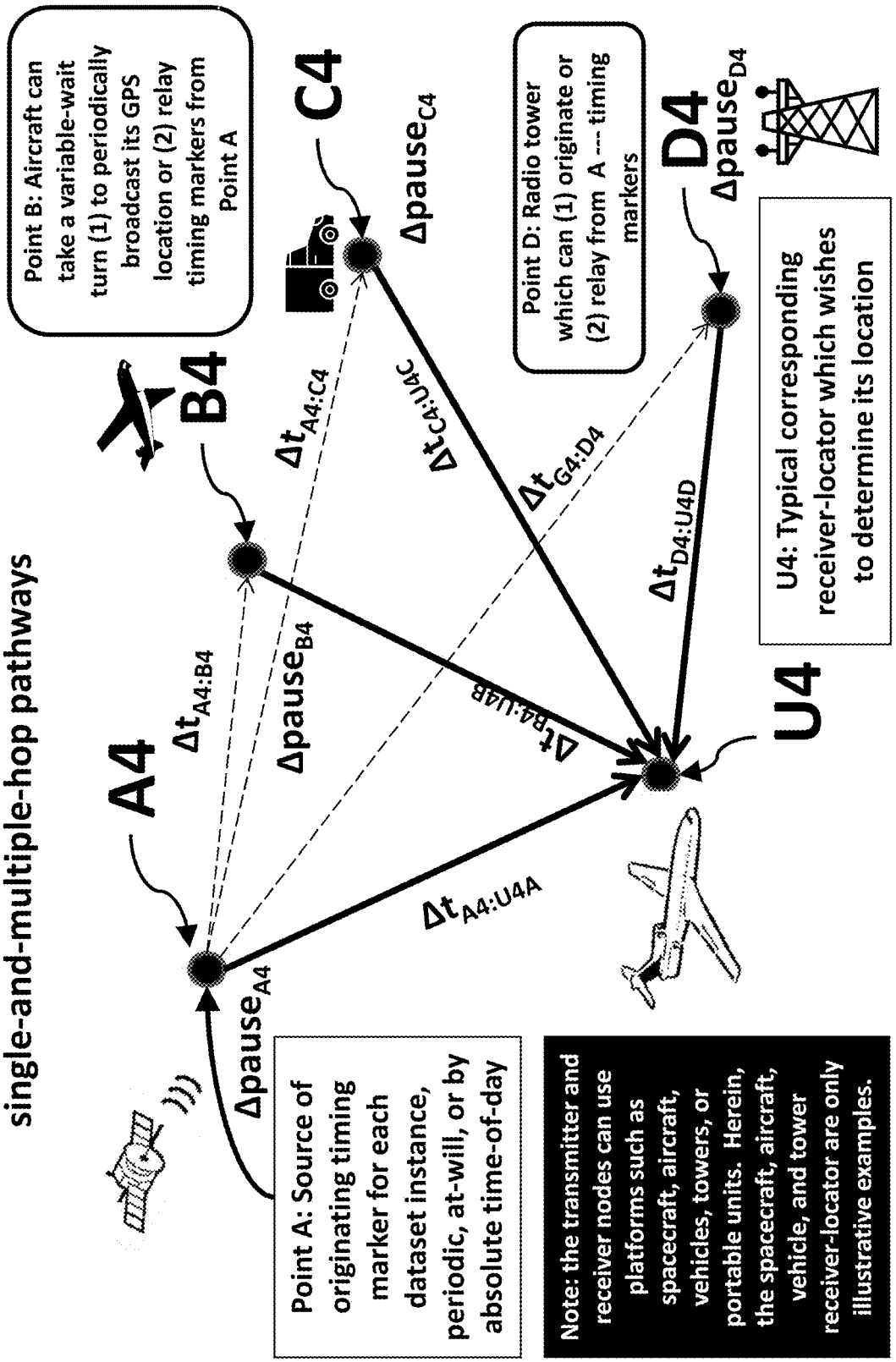
FIG. 10 shows "A system with multiple alternative single-and-multiple-hop pathways".

FIGS. 6, 7, and 10 show a moving #U receiver-locator platform with several dataset clusters of impinging signal legs on U's pathway in a straggling pattern which may be a result of (1) fast moving receiver #U, (2) delays or pauses when transmitting timing markers, (3) inherent delays in relaying of transmissions, or (4) the use of unsynchronized random timing marker transmissions from multiple platforms. Transmitter platforms #0, #A, #B, #C, #D, or others as well as receiver-locator #U are distributed and moving over 3D space.

Traditional trilateration or multilateration approaches would have platforms such as #0, #A, #B, #C, or #D operate as timing marker originator transmitters for physical timing markers. Traditional GPS receiver-locator solutions which provide MILLIMETER precisions (instead of readily available 3-meter precisions) require many, many timing-marker samplings typically over 15 to 30 minutes. (Some writers have suggested that future millimeter-precise portable devices are possible by using very, very precise portable atomic clocks, which are not yet available; re: "Millimeter accurate GPS in smartphones and self driving cars would result from tiny atomic clocks", Brian Wang, Nov. 30, 2016, https://www.nextbigfuture.com/2016/11/millimeter-accurate-gps-in-smartphones.html.)

Alternative trilateration or multilateration approaches would have at least one transmitter function as an originating transmitter platform (such as #O) while one-or-more of the other of the aforementioned transmitter platforms such as #A, #B, #C, or #D could alternatively act as relay transmitters which transmit corresponding timing markers when any selected-or-designated timing markers arrive from an originating transmitter or another relay transmitter. As mentioned earlier, (1) this can reduce or obviate the need for precise time synchronized clocks across these transmitters and (2) provides an opportunity to insert additional intervening timing markers. (Note: And when millimeter precisions are desired, virtual timing markers referencing underlying carrier-waveform changes or carrier-less equivalents may be used.)

Figure 8:
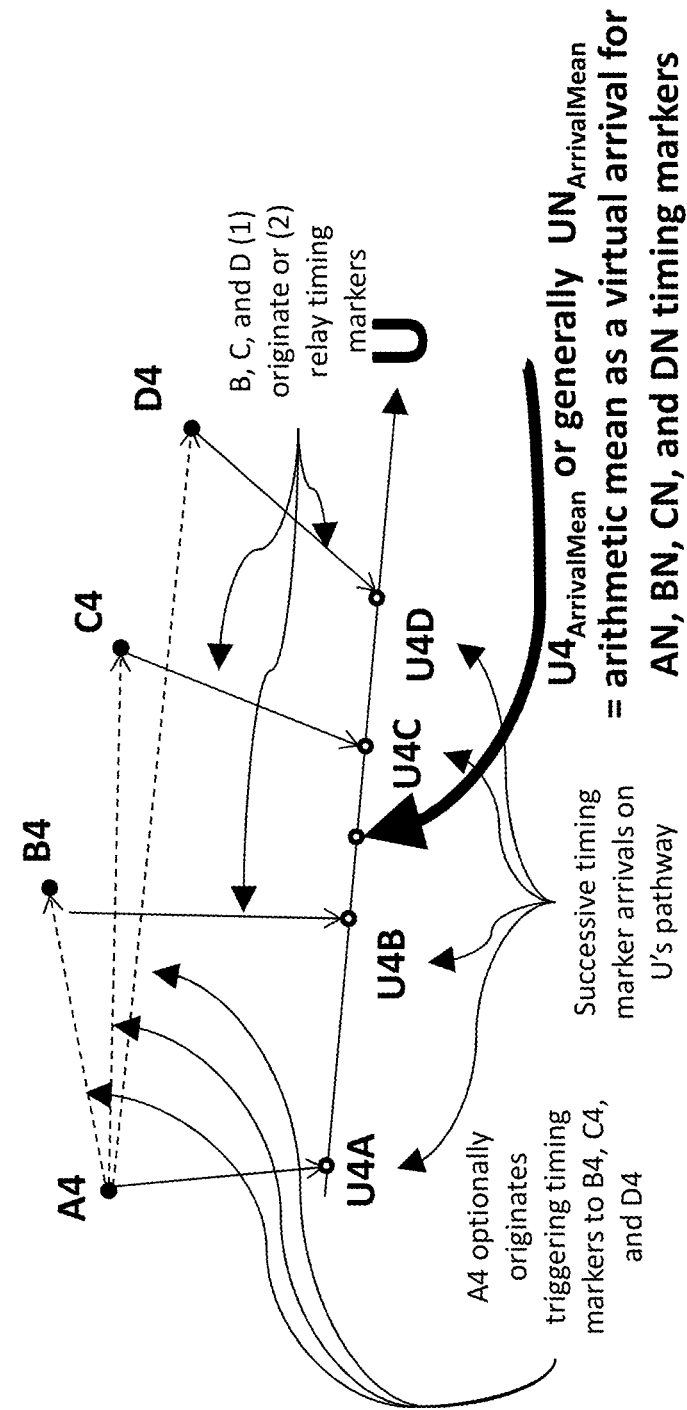
FIG. 8 shows "A map of (a) straggling timing marker time-intervals and (b) potential Phantom Virtual Arrivals of Timing Markers which can time-align or converge on an arbitrarily chosen UN$_{ArrivalMean}$".

FIG. 8 shows possible configuration options of either (a) multiple originator transmitters as a traditional single-hop configuration or (b) one-or-more originators WITH one-or-more downstream relay transmitters as an alternative single-and-multiple-hop configuration—ultimately transmitting to a fast-moving receiver U with one or more of the following options:

Option #1: (Single-Hop Time-Synchronized Transmissions) In this traditional mode, transmitters #A, #B, #C, and #D have time synchronized clocks which reference the same time standard. Each transmitter broadcasts its own originating trigger timing markers to any corresponding receiver nodes #U. The transmitters may or may not pause before transmission of timing markers. And when millimeter precisions are desired, such as when receiving GPS signals, many inherently-scattered timing marker samplings over 15 to 30 minutes may be required.

Option #2; (Single-and-Multiple-Hop (Relayed) Transmissions) In this mode, one or more type #A originating transmitters singly, periodically, or arbitrarily broadcast originating triggering timing markers to nodes #B, #C, #D, and #U. When relay transmitters such as #B, #C, and #D receive the originating triggering timing markers, they (a) may or may not pause and (b) relay or broadcast their own relay timing markers to (i) #U or any other corresponding receivers or (ii) or other selected relay transmitters.

It is a given condition that the precise locations for transmitters and corresponding times of timing marker departures from #A, #B, #C, #D, etc. for any instance N are (i) known or (ii) can be determined. The AN, BN, CN, DN, . . . , UN notation is to the Nth instance of a dataset N. Because #U is moving, the various AN, BN, CN, DN, . . . , timing marker arrival points at the #U receiver-locator may be straggled along #U's pathway. Where the instance is numbered as #4,the arrival points are labeled U4A, U4B, U4C, and U4D.

Figure 9:
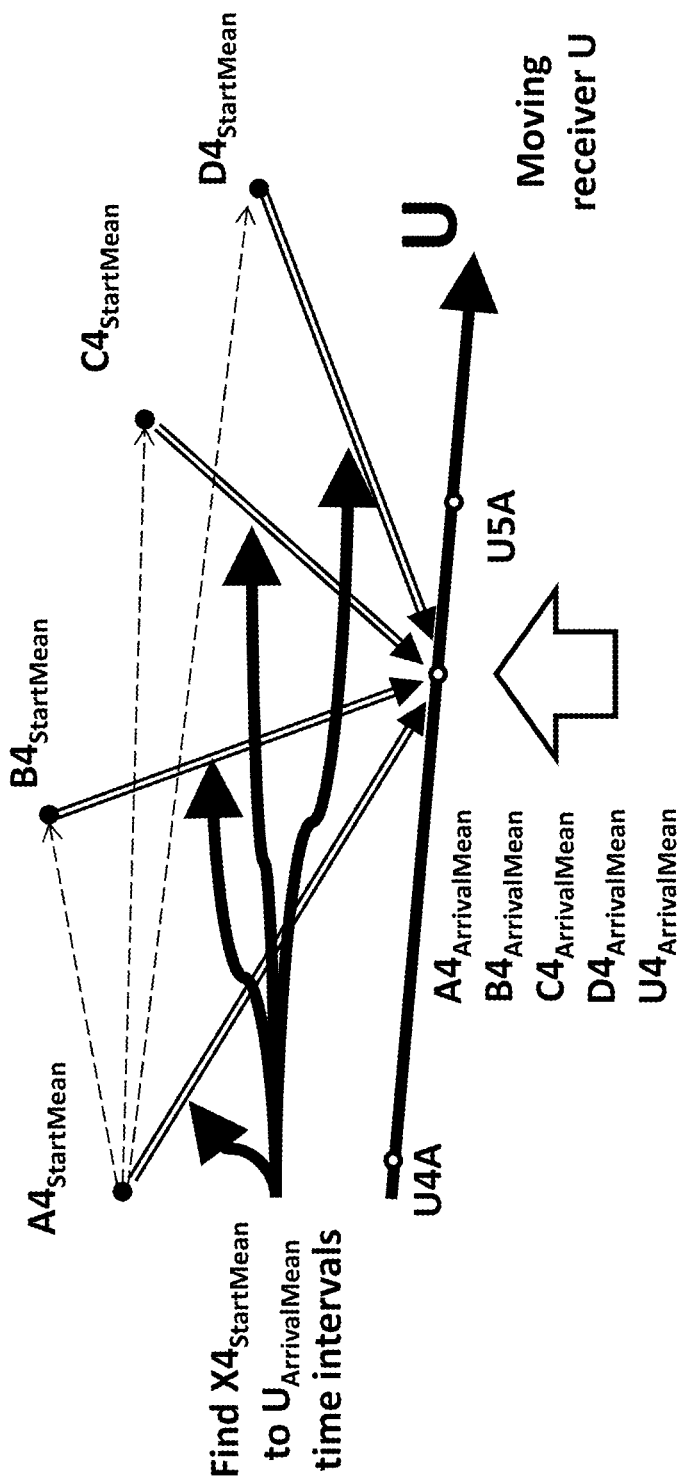
FIG. 9 shows "A remapped rendition with VIRTUAL ARRIVALS OF TIMING MARKER replacement time interval legs which are time-aligned or converging on an arbitrarily chosen UN or UN$_{ArrivalMean}$".

Referring to FIG. 9, a different topological "mapped" perspective can be rendered. For each dataset instance, one can arbitrarily choose to create and target an imaginary alternative single time-aligned arrival point for timing markers from A, B, C, and D on U's pathway. In this example, the point is arbitrarily chosen as the arithmetic mean $UN_{ArrivalMean}$ arrival point for the values of the dataset N. The immediate goal is to create phantom virtual arrivals of timing markers such that (1) they appear and behave as though they arrived at the same instant or spot on the path of the Point U receiver-locator and (2) they still accurately reflect timing marker travel time effects after being transmitted at corresponding phantom virtual departure points from the pertinent stationary-or-moving transmitters #A, #B, #C, or #D.

Note that the spot on the path can be an arbitrary one selected by the designer or implementer. The spot could represent the "arithmetic mean, median, mode, or solution point to a least mean square error calculation" of the timing marker arrivals. The choice of an arithmetic mean location may be reasonable because any precision errors may compensate or average themselves towards a more correct value. Least mean square may bias large errors more heavily away from the other arrivals. So, the rest of this embodiment-or-topic example will use an arithmetic mean.

For example, in transitioning from FIG. 8 to FIG. 9 in order to reduce or eliminate straggling of time of arrival points, adjustments must be rendered for each final leg such as a relay transmission leg as a participant of a dataset. For an instance of dataset #N, where N equals 4, (i) a Point B4 broadcast location on the Point B platform pathway must be "virtually" relocated to a point at $B4_{StartMean}$ and (ii) Point C4 on the Point C platform pathway must be replaced by a point at $C4_{StartMean}$. Both the corresponding $B4_{ArrivalMean}$ and $C4_{ArrivalMean}$ points as "phantom virtual arrivals of timing markers" should overlap the chosen point $U4_{ArrivalMean}$ on the Point U platform pathway arrival timeline.

Of course, when no timing marker straggling occurs, no "phantom virtual arrivals of timing markers" to obtain signal timing marker travel times is necessary.

The new time interval legs must be located and calculated.

This discussion assumes (1) that there is a transmitter on Platform A which transmits originating timing markers and (2) platforms B, C, and D transmit corresponding relay timing markers.

Transmitter and receiver platforms such as (#A, #B, #C, #D, and #U) can be assumed to be moving in piecewise straight-line paths as viewed over short time intervals in 3D space.

Note that any A, B, C, D, or U platform movement is likely to be slow compared to the speed of radio signals (e.g., (a) a moving aircraft versus a radio signal—would be (b) less than 600 miles per hour versus a radio signal's 186,000 miles per second which is 669,600,000 miles per hour).

"Instance": an instance N is to one set of data from multiple transmitters at Points AN, BN, CN, DN, or others where each transmits a precise signal timing marker which arrives at any corresponding receiver-locator such as #U in a short interval.

Platform AN may broadcast originating, triggering timing markers to BN, CN, DN, and UN nodes.

Both (a) the locations of A, B, C, and D at time of indicated timing marker departures are known or can be determined and (b) the time intervals between the AN-to-BN, AN-to-CN, and AN-to-DN broadcasts are known or can be determined. For N=4, the intervals use the notations: $\Delta t_{A4:B4}$ and $\Delta t_{A4:C4}$ respectively. Platforms BN, CN, and DN can either: (a) (Single-hop) transmitting their timing markers according to time synchronized clocks which span across platforms A, B, C, and D or (b) (Single-and-multiple-hop) (i) cases of transmitting their relayed timing markers in response to receiving timing markers from originating or other relay timing marker transmitters or (ii) cases of transmitting timing markers in a single-hop directly to one or more corresponding end-user-client-receivers.

An instance N can be initiated when (a) (Single-hop) the transmitters use time-synchronized clocks and times of day to orchestrate their broadcasts or (b) (Single-and-multiplehop) (i) #A-type originating transmitters, (ii) third-party-other-purpose platforms, or (iii) even GPS spacecraft acting as originating transmitter agents—send triggering timing markers to (i) groups of relay transmitters to relay their broadcasts, (ii) constituent receivers, or (iii) end-user-client-receivers.

FIG. 10 shows a Point U receiver-locator platform (such as an aircraft) moving in 3D space. Transmitters A, B, C, and D may be also moving. It is given that the precise locations and corresponding times-of-departure for transmitters A, B, C, and D for any instance N are known or can be determined whenever they transmit a timing marker.

Meanwhile FIG. 8 renders the corresponding successive timing marker arrivals at points U4A, U4B, U4C, and U4D on U's pathway. For an instance for A4, B4, C4, and D4 where N equals 4, the timing marker from "A4" arrives at Point U4A; later a timing marker from "B4" arrives at Point U4B; a timing marker from "C4" arrives at Point U4C; and finally, a timing marker from "D4" arrives at Point U4D.

Corresponding timing marker travel or transit times become time interval values: $\Delta t_{A4:U4A}$, $\Delta t_{B4:U4B}$, $\Delta t_{C4:U4C}$, and $\Delta t_{D4:U4D}$ At the U platform, time difference of indicated arrival values become $\Delta a_{U4A:U4B}$, $\Delta a_{U4B:U4C}$, and $\Delta a_{U4C:U4D}$.

Figure 11:
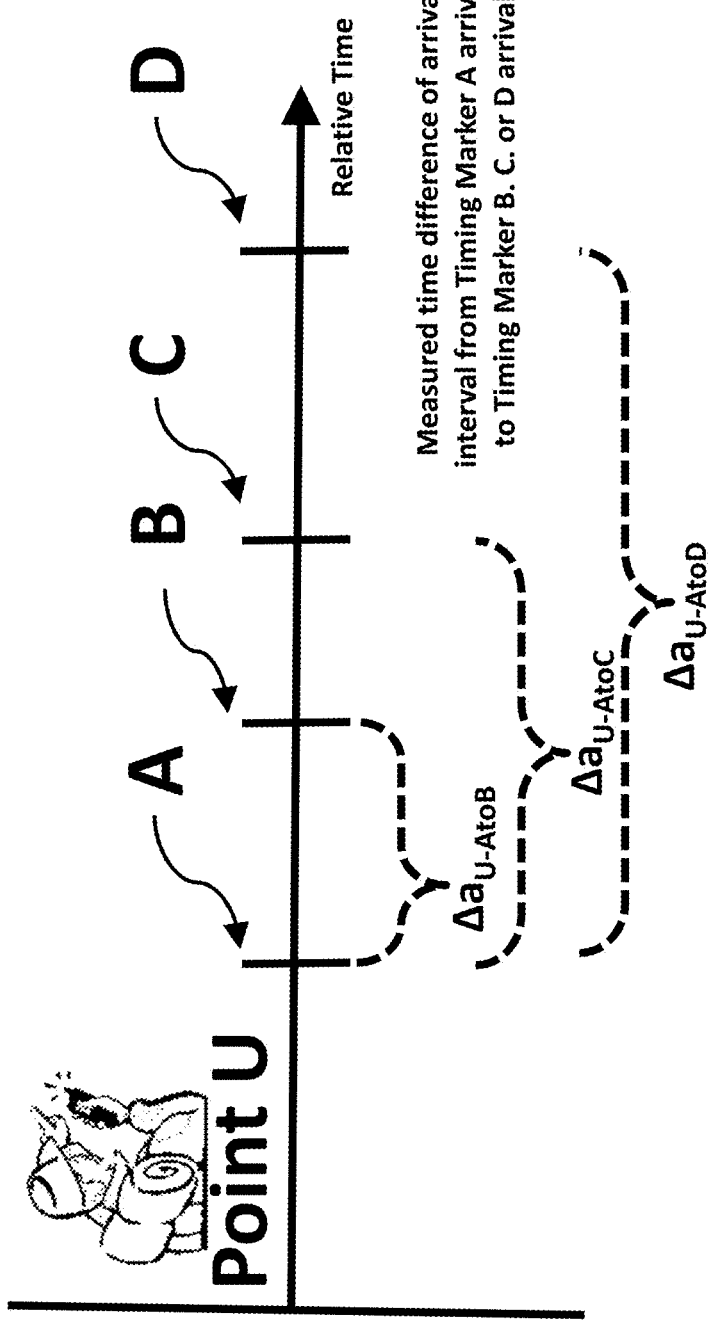
FIG. 11 shows "A receiver node "U" showing Δa measured time differences of arrival intervals of timing markers from A, B, C, and D at receiver locator Point U with location to be determined".

FIG. 11 shows a receiver-locator #U timeline for the arriving A4, B4, C4, and D4 indicated timing markers based on an onboard #U local clock. It indicates time-tags and calculated time differences of indicated arrival intervals as perceived by #U. The receiver-locator may also count, tag, or track carrier-cycles-and-fractional-counts of received signals and-or onboard timing reference signals—between timing markers or arbitrarily-defined-periodic-intervals.

FIG. 8 shows a local receiver-locator #U geometry for the arriving A4, B4, C4, and D4 timing markers based on an onboard #U local clock which can be used for either single-hop or single-and-multiple-hop discussions.

When the indicated arriving timing markers (U4A, U4B, U4C, and/or U4D) adequately coincide-or-converge on a stationary or slow-moving U platform pathway, traditional trilateration or multilateration can be used to determine the geometric intersection of as well as convert the time intervals into distances.

Since the locations of A4, B4, C4, and D4 at times of timing marker departures are precisely known or can be determined—as an original condition for the embodiment,—A, B, C, and D can be moving without affecting the location determination of U.

The relative distances of U to Points A4, B4, C4, and D4 plus their absolute locations can be used to determine the absolute location of Point U Where v=the velocity of a radio signal in the pertinent atmospheric medium, $\Delta t_{xy}$ equals the transit time interval, and $\Delta distance_{xy}$ is the corresponding distance traveled in time interval $\Delta t_{xy}$, the following equation shows how to compute the corresponding distance:

$$\Delta distance_{xy} = v * \Delta t_{xy}$$

See FIG. 9. If the timing marker travel intervals could be realigned as phantom virtual arrivals at a single U pathway point, traditional trilateration could be used to determine the virtual time intervals for corresponding final-leg timing marker travel. Then the time intervals traveled could be converted into corresponding distances traveled: $\Delta distance_{A4StartMean:U4ArrivalMean}$, $\Delta distance_{B4StartMean:U4ArrivalMean}$, $\Delta distance_{C4StartMean:U4ArrivalMean}$, and $\Delta distance_{D4StartMean:U4ArrivalMean}$.

Note that (i) when trilateration is used and (ii) when only 3 final pathway legs to Point U are calculated, there can be two intersection solutions of three spherical intersections: at one point above the ABC plane and one below. It is assumed that the pertinent scenario indicates which above or below solution is appropriate; otherwise an additional known transmitter or receiver node D is needed.

Also note that A4, B4, C4, D4, and U must be distributed over 3D space and not coincident on the same point, line, or plane. Greater angular dispersion of final-leg timing marker pathways at an arrival point yields better numerical results.

More transmission points beyond A, B, C, or D can be added to better statistically converge on more precise values or minimize the error according to goodness criteria.

PART 2 OF TOPIC #SZX0D—Choosing a Target$_{Arrivalmean}$ as a Desirable Phantom Virtual Arrival Point on a Receiver Pathway or Choosing Corresponding Transmitter Phantom Virtual Departure Points When arriving timing markers straggle along a moving receiver's pathway, location determination can be improved by using a combination of one or more of the following: (1) interpolation-extrapolation-or-other methods to realign the timing markers as (a) coinciding phantom-virtual-timing-marker arrivals or (b) orchestrated phantom-virtual-timing-marker departures, (2) single-and-multiple-hop pathways, or (3) virtual timing marker methods.

Turning to FIG. 8, discussions will now describe methods such that final leg arrival points UNA, UNB, UNC, UND on the platform U pathway or other transmitters can also have coinciding phantom virtual arrivals of timing markers such as $AN_{ArrivalMean}$, $BN_{ArrivalMean}$, $CN_{ArrivalMean}$, $DN_{ArrivalMean}$, etc. for any dataset N. These virtual arrivals will overlap at the Point $UN_{ArrivalMean}$ instance or any other arbitrarily chosen convergence point on the U pathway.

The timing marker arrivals on the U pathway are detected, time-displacement-or-position tagged, and recorded—using signals arriving at receiver U and-or onboard time.

Note: some transmitter or receiver implementations may also periodically tag and log intervening carrier-cycles-and-fractional counts (or carrier-less equivalents) of either-or-both incoming signals or onboard time reference signals.

$\Delta a_{U-XtoY}$ time differences of arrival can also be measured or calculated if needed.

An arithmetic mean arrival from AN, BN, CN, or DN transmitters can be computed and labeled as "$UN_{ArrivalMean}$", "$UN_{TargetMean}$" etc. Referring to FIG. 9, if one wishes to have all such arrivals focus and align on one spot $UN_{ArrivalMean}$ on the U pathway, then $AN_{ArrivalMean}$, $BN_{ArrivalMean}$, $CN_{ArrivalMean}$, $DN_{ArrivalMean}$, etc. should overlap. Optionally, some other nearby target point on U's pathway can be alternatively selected.

Figure 12:
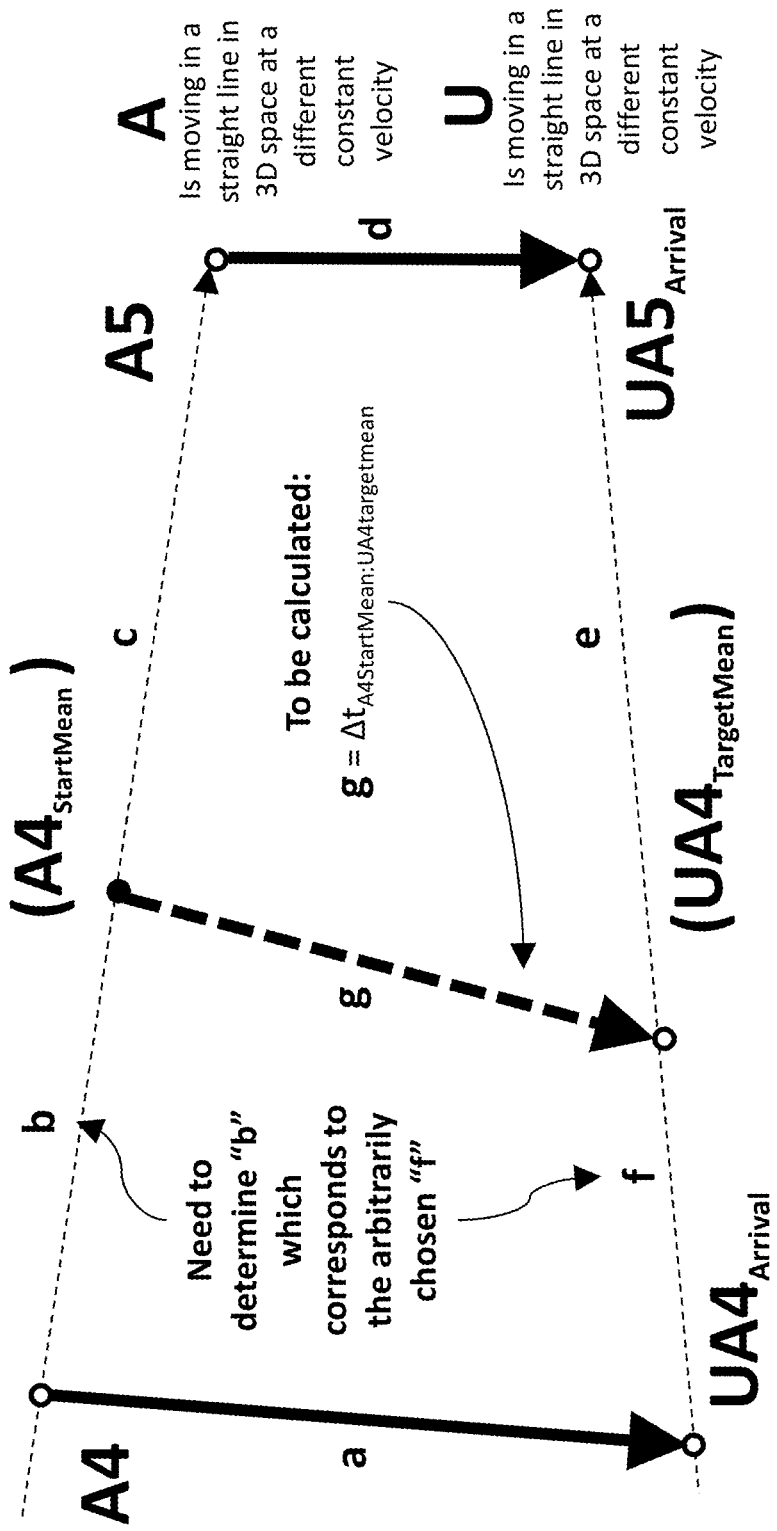
FIG. 12 shows "A map for calculating the time interval from the (A4$_{StartMean}$) position along the Point A A4: to A5 pathway to the Point UA4$_{TargetMean}$ position".

Turning to FIG. 12, a map for calculating the time interval from the ($A4_{StartMean}$) position along the Point A A4: to A5 pathway to the Point $UA4_{TargetMean}$ position is provided.

Platform A broadcasts a timing marker from transmitter Point A4 to receiver Platform $UA4_{Arrival}$ Platform A travels a short distance at constant velocity to Point $A4_{StartMean}$ Platform A can broadcast a real-or-imaginary intervening timing marker from Point $A4_{StartMean}$ to $UA4_{TargetMean}$ Platform A travels at constant velocity a short distance to Point A5

Platform A immediately broadcasts another timing marker to $UA5_{Arrival}$

The visual "paper" distances do not accurately reflect time durations or intervals in 3-D space. This diagram is intended to be a transit time interval mapping to (a) identify pertinent time intervals, (b) identify their pathways, and (c) account for (i) time of indicated arrivals or (ii) time differences of indicated arrivals. "Topological mapping" is the properties of geometric forms that remain invariant under certain transformations such as bending or stretching; a topological map is a type of diagram that has been simplified so that only vital information remains and unnecessary detail has been removed. Because platforms (e.g., such as 600 mph) and radio signals (i.e., 186,000 miles per second=669,600,000 miles per hour) have such different velocities, a topological mapping can have a much different appearance than "to scale" mapping.

Possible Different Indicated Timing Marker Arrival Patterns at a Corresponding Receiver Platform Still referring to FIG. 12, from a platform U time perspective,—for (a) any timing travel summation comprising SIGNAL timing marker travel followed by PLATFORM U travel (i.e., timing travel from A4-to-UA4$_{Arrival}$ followed by platform U travel to UA4$_{TargetMean}$), there is (b) a corresponding travel summation comprising PLATFORM A travel followed by SIGNAL timing marker travel (i.e., Platform A travel from A4-to A4$_{StartMean}$ followed by signal timing marker travel to UA4$_{TargetMean}$). Both pathways rendezvous at the same time at UA4$_{TargetMean}$.

If platform A were to broadcast (for example, nine) equal-interval markers-or-carrier-cycle-and-fractional-counts at intervening points on pathway A4 to A5 (herein referred to as "recent intervening timing marker offset tables"), there is the question of how the (for example, nine) arriving intervening points would correspondingly arrive on the pathway UA4 to UA5 such as Cases 1 through 4.

Case 1: As fluctuating width time interval arrivals due to platform U changing course (although this discussion originally presumed a straight-line constant velocity over short intervals).

Figure 13:
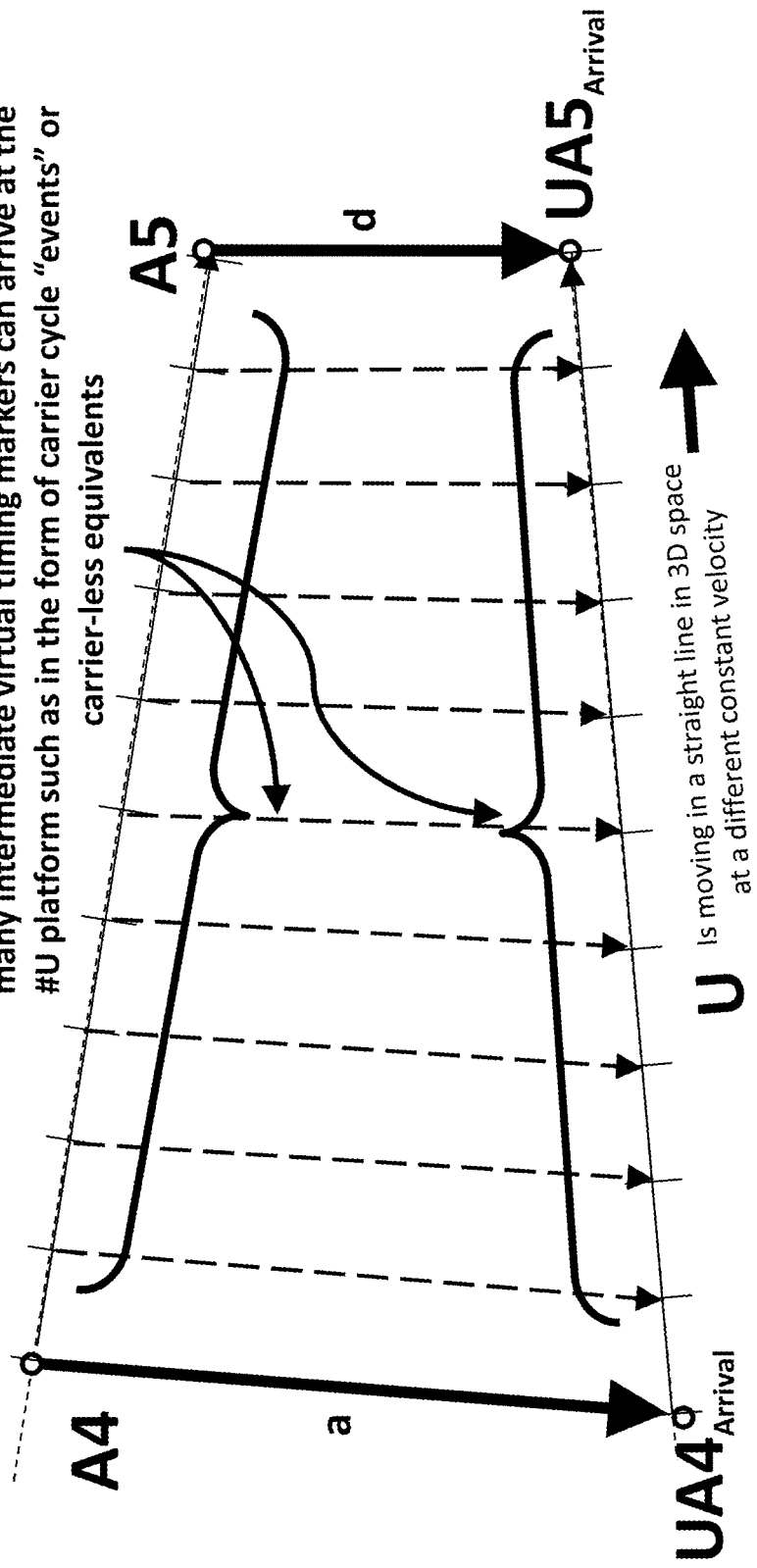
FIG. 13 shows "Equidistant arrivals of intervening timing markers while time-interval mapping Point #A, Point #U, and transmission pathways".

Case 2: At equidistant arrival points such in FIG. 13.

Figure 14:
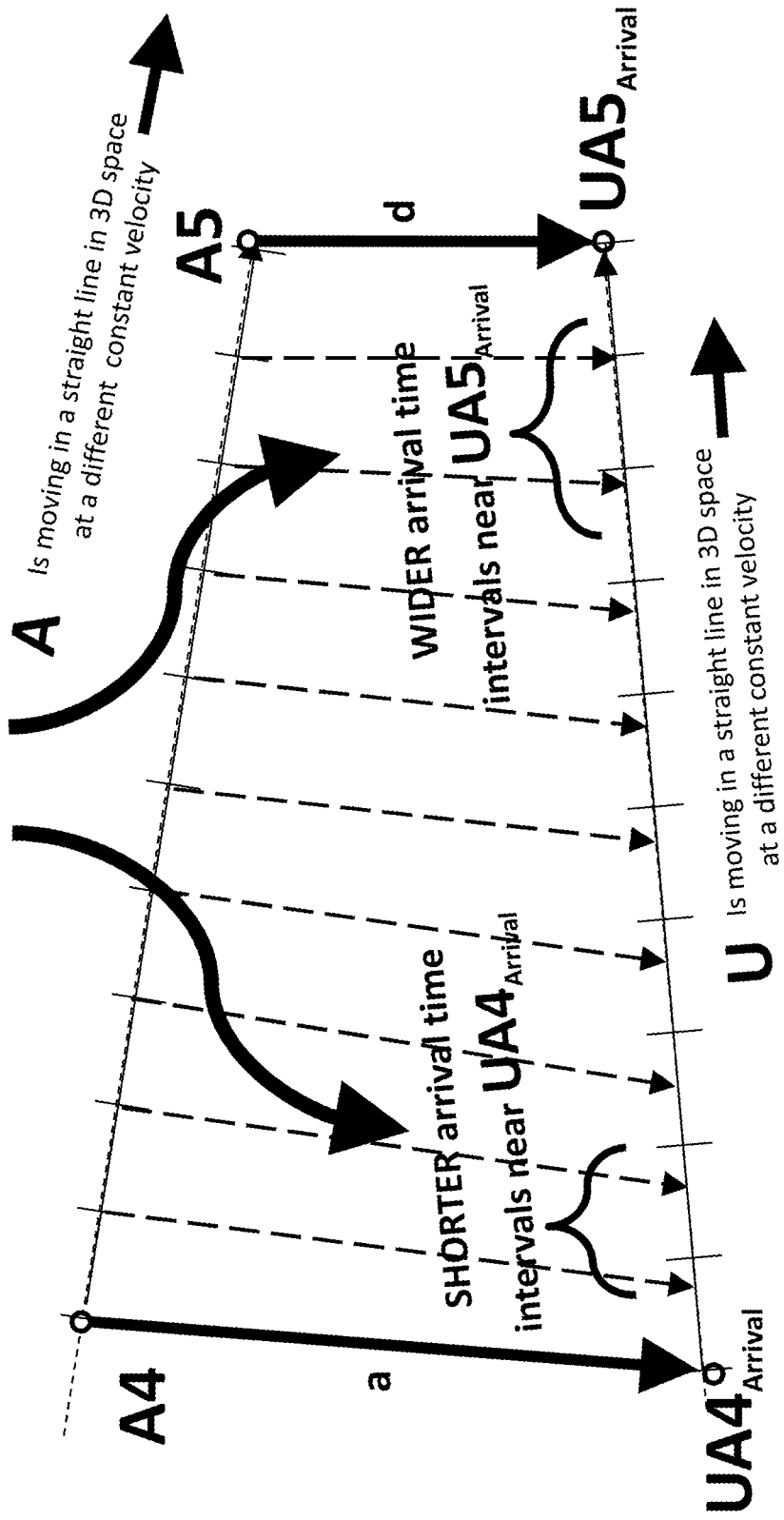
FIG. 14 shows "Intermediate virtual pathways may arrive with wider, shorter, or unchanged time intervals in-between as receiver #U moves along".

Case 3: At increasingly wider or shorter arrival time intervals such as in FIG. 14.

Case 4: In a different distribution pattern but still mathematically describable with an equation.

Figure 15:
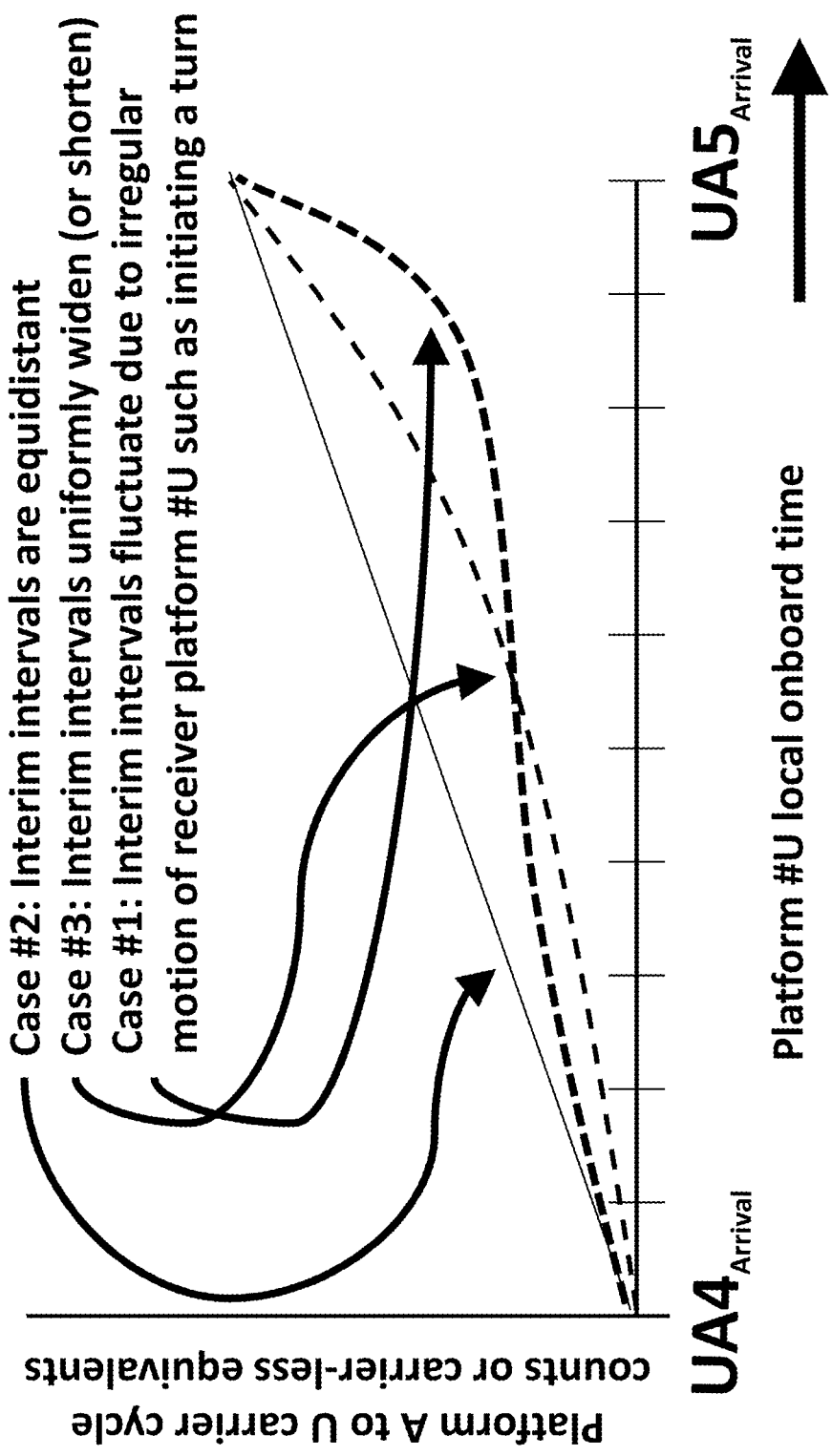
FIG. 15 shows "Potential platform #U's perceived carrier cycle count graphs which would be transmitted at equal time intervals from platform #A's perspective".

Given that platform A has a continuous transmission and thus a signal with a continuous carrier (or carrier-less equivalent), platform U from a local platform U time perspective can time-tag, count, log, or plot the cumulative number of carrier-cycles-and-fractional counts (or alternatively carrier-less-equivalents) between arriving physical timing markers as shown in FIG. 15. The first three mentioned cases are drawn on 3 separate curves.

Case 1: Interim intervals fluctuate due to irregular motion of receiver platform #U (such as receiver platform #U initiating a turn).

Case 2: Interim intervals are equidistant.

Case 3: Interim intervals uniformly widen (or shorten).

Case 4: Situations where arriving intervening time intervals from an upstream transmitter are mathematically describable.

FIG. 16 shows that once a UA4$_{TargetMean}$, is chosen on the x-axis,—the interval accumulation of (1) carrier cycle and fractional counts or (2) carrier-less equivalents (as "recent intervening timing marker offset tables") can be addressed such as by one or more options.

Option #1: By interpolating between receiver arrival log entries which include timing marker arrivals plus intervening cycle and fractional or equivalent counts, it is possible to determine UA4$_{TargetMean}$ time or displacement offsets from UA4.

Option #2: By interpolating between corresponding transmitter log entries which include timing marker departures with times-and-locations plus intervening cycle and fractional or equivalent counts, it is possible to determine A4$_{StartMean}$ time or displacement offsets from A4.

Option #3: By alternatively using a Case 2 or Case 3 type regression conversion equation, the (a) transmitter "Start-Mean" precise locations, (b) times of timing marker departures, and (c) intervening (carrier-cycle-and-fractional-counts-or-carrier-less-equivalent) point offsets—are known or can be determined:

Because as a design or implementation condition, the precise locations and corresponding times of indicated departures of timing markers of the originator-or-relay transmitter platforms such as at (A4, B4, C4, D4, A5, B5, C5, D5, A4$_{StartMean}$, B4$_{StartMean}$, C4$_{StartMean}$, D4$_{StartMean}$) are known or can be determined.

The precise times of departures from A4$_{StartMean}$, B4$_{StartMean}$, C4$_{StartMean}$, D4$_{StartMean}$ can be expressed or determined to be time-offsets (or equivalent displacement-offsets) from the indicated physical timing marker departures such as at points A4, B4, C4, or D4.

Therefore, the precise locations of the originator-or-relay transmitter platforms at (A4$_{StartMean}$, B4$_{StartMean}$, C4$_{StartMean}$, D4$_{StartMean}$) and times of indicated virtual departures of timing markers are known or can be determined.

The actual (a) A4$_{StartMean}$ to UA4$_{TargetMean}$, (b) B4$_{StartMean}$ to UB4$_{TargetMean}$, (c) C4$_{StartMean}$ to UC4$_{TargetMean}$, (d) D4$_{StartMean}$ to UD4$_{TargetMean}$, etc.—(a) time intervals or corresponding distances can be ultimately calculated by single-or-multiple-hop calculations, trilateration, multilateration, or similar calculations and (b) relative or absolute locations of platform U can be determined.

In situations when trajectories of A, B, C, D, and U remain adequately unchanged over short time intervals, the above method may be similarly used to estimate or extrapolate the next upcoming TargetMean U(N+1)$_{TargetMean}$ point location (e.g., having (a) readings for A5 and UA5, (b) not yet having A6 or UA6, but desirous of estimating (c) A5$_{StartMean}$ and UA5$_{TargetMean}$ positions). But values based on ACTUAL measurements are preferable to estimated or extrapolated values.

PART 3 OF TOPIC #4 (Also Referred to as SZX0D)—STEPS AND OPERATIONS

Static Arrangement

The arrangement is like those of FIG. 6 although there could be many more originating transmitters, relay transmitters, (constituent receivers which are used to locate selected upstream transmitters), receivers, or user receiver-locators.

For all pertinent transmitter platform nodes (#O$_{Originator}$, #A, #B, #C, #D, etc.) it can be assumed that (a) originator or relay transmitters can be stationary or moving or (b) (i) the precise times of timing marker departures, (ii) the corresponding precise locations of transmitters #O$_{Originator}$, #A, #B, #C, or #D, and (iii) any pertinent timing marker pause or delay information for any relay nodes—are known-or-determinable ultimately where location or other PNT parameters are determined Turning to FIG. 7, a corresponding receiver platform #U can be moving in a straight or irregular path between any two successive dataset instances. In this example, the transmitters can includes one or more options below.

Option #1: One or more originator transmitters which may transmit originating-or-triggering timing markers—periodically, according to scheduled times-of-day, arbitrarily, randomly, upon request, etc. These timing markers may be (i) tailored and formal well-defined timing markers or (ii) intrinsic happenstance waveforms which can be selected, improvised, or adopted as precision timing markers. Thus, they may be constituent or non-constituent originator transmitters.

Option #2: Zero, one, or more relay transmitters can receive identifiable-or-selected arriving timing markers from "upstream" transmitters and relay-or-transmit corresponding timing markers with measurable-or-determinable zero, positive, or negative delays as well as constant-or-variable delays.

Option #3: Zero or more two-way transmission node pairs can alternatively determine the range between them by having one side echo back a radio response to the other side, so that the round trip time can be measured and thus used to calculate the node-to-node distance.

When in a two-dimensional (2D) problem field,—2, 3, or more transmission nodes and any corresponding client-receiver nodes are dispersed in the 2D space and at least 2 or 3 transmission nodes do not reside on the same point or line.

When in a three-dimensional (3D) problem field,—3, 4, or more transmission nodes and any corresponding client-receiver nodes are dispersed in the 3D space and at least 3 or 4 transmission nodes do not reside on the same point, line, or plane.

When in a one-dimensional (1D) problem field,—2 or more transmission nodes and any corresponding client-receiver nodes are dispersed in the 1D space and at least 2 transmission nodes do not reside on the same point.

When additional location information is available, the above minimum number of transmission nodes can be correspondingly reduced.

Optional Steps of Implementation or Operation
Transmitters

Calibrate the timing mechanisms of #$O_{Originator}$, #A, #B, #C, #D, or #U platforms to a time standard or use calibration-distances as necessary, so time intervals can be adequately, accurately, and precisely converted to corresponding standard distances. Alternatively, dynamically use calibrated or precision standard time sources.

For any pertinent two-way transmission range determination pair arrangements, perform such transmissions, time-tagging, and calculations—as being one-or-more of: when-needed, periodically, adequately frequently, according to scheduled time-of-day, arbitrarily, or similar arrangements.

Successively repeat transmission sets-of-instance cycles as appropriate (see below).

For each set-of-instance transmission cycle, have-or-use (constituent or non-constituent) originating transmitters—to initiate originating transmissions of (i) originating-or-triggering timing markers as well as forward (ii) times of indicated timing marker departure, (iii) each originator's corresponding precise location at times of indicated timing marker departures, and—such as (a) as needed, (b) periodically, (c) arbitrarily, (d) by pre-arranged absolute times of day, or (e) similar arrangements.

For each set-of-instance transmission cycle, have (constituent or non-constituent) originating transmitters—optionally transmit aforementioned "recent intervening timing marker offset tables" which indicate, for preceding-or-recent departing timing marker times-or-intervals, entries of intervening data points where each entry includes (1) (a) the precise location or offset of the transmitter or (b) raw data for determining such—and (2) the corresponding elapsed time, carrier-cycle-and-fractional counts, or carrier-less-equivalents since a first-or-recent departing timing marker bounding the interval—for example with ten or a hundred entries per selected-or-designated timing marker departure interval.

For each set-or-instance of transmission cycles, have (constituent or non-constituent) originating transmitters—transmit or forward any other pertinent timing marker hop-or-node history PNT data.

For each or arbitrarily selected transmission cycle instance, have any pertinent receivers (a) which are used to determine the precise locations or PNT parameters of any selected upstream originating transmitters or relay transmitters and (b) whose precise receiver locations and times at indicated timing marker arrivals are known or determinable—(a) receive, (b) process, (c) interpret, or (d) forward to other selected downstream receivers—precise upstream transmitter locations, precise corresponding times, raw data, reduced data, or other applicable PNT-related data for determining the locations, corresponding times, or other PNT parameters of such upstream transmitters.

For each or arbitrary transmission cycle instance, have any pertinent relay transmitters—(i) wait to receive selected-or-designated triggering timing markers from originating transmitters or other selected relay transmitters or (ii) use other similar arrangements such as by scheduled time-of-day.

For each or arbitrary transmission cycle instance, have any pertinent relay transmitters—receive and time-displacement-or-signal-position-tag all-or-selected arriving timing markers.

For each or arbitrary transmission cycle instance, have any pertinent relay transmitters—Broadcast or relay items such as (i) corresponding timing markers, (ii) a relay-transmitter's precise locations at indicated timing marker arrivals or raw location-determination data, (iii) a corresponding relay-transmitter's times of indicated timing marker arrivals, (iv) selected-or-pertinent transmitter's precise locations at indicated timing marker departures or raw location-determination data, (v) the corresponding times of indicated timing marker departures, (vi) timing marker ID's, (vii) signal ID's, (viii) the time-intervals of any significant delay or pause between receipt of an upstream timing marker and transmission of a corresponding timing marker, or (ix) any received "recent intervening timing marker offset tables".

For each or arbitrary transmission cycle instance, have any selected-or-pertinent relay transmitters—in actions which are similar to originator transmissions—if appropriate for the application or by prior arrangement, construct and transmit aforementioned "recent intervening timing marker offset tables" which indicate, for a preceding departing timing marker time interval, entries of intervening data points where each entry includes (1) (a) the precise location, displacement, or offset of the RELAY transmitter or (b) raw data for determining such—and (2) the corresponding elapsed time, carrier-cycle-and-fractional counts, or carrier-less-equivalents since the first indicated departing timing marker bounding the interval—for example with ten or a hundred entries per designated timing marker departure interval.

For each or arbitrary transmission cycle instance, have any pertinent relay transmitters—transmit or forward any other pertinent timing marker hop-or-node history data.
Receivers For each transmission cycle instance, have any corresponding receiver-locator U receive pertinent signals as well as—receive selected timing markers and pertinent information such as: (i) selected-or-designated timing markers with their indicated arrival time-displacement-or-signal-position tags, (ii) timing marker identification, (iii) relay transmitter delay or pause duration information, or (iv) any other pertinent timing marker histories, hop-or-node histories, and information.

For each transmission cycle instance, have any corresponding receiver-locator U receive pertinent signals as well as—time-displacement-or-position tag indicated positions of arriving timing markers using (a) local precise time, (b) counters, (c) received signal carrier-cycle-and-fractional counts or carrier-less equivalents, (d) onboard-or-reference signal carrier-cycle-and-fractional-counts or carrier-less equivalents, or (e) other similar methods.

(Skip the Next Section if not a Fast Moving Receiver)

If a relevant U receiver-locator platform is (a) stationary or adequately slow moving and (b) the upstream transmitter platforms have zero or adequately negligible pauses before transmitting—in regards to achieving or maintaining adequate precision, skip the next section for fast moving receivers.

(Paragraphs below: for fast moving receivers or pertinent upstream transmitters with significant delays before transmissions)

Have one-or-more selected corresponding client-receiver u receive and temporarily store data from upstream transmitters which were mentioned above (a) for each potential-or-selected final-arrival-leg-or-hop upstream transmitter: all-or-selected aforementioned "recent intervening timing marker offset tables" which contain multiple entries of periodic intervening transmitter locations and corresponding times-or-offsets as transmitter times, time intervals, carrier-cycle-and-fractional-counts, or carrier-less equivalents since the first-or-recent departing timing marker bounding the interval or (b) for each potential-or-selected final-arrival-leg-or-hop upstream transmitter: using onboard time to time-tag and log elapsed signal source carrier-cycle-and-fractional counts or carrier-less equivalents both (i) at all-or-selected indicated timing marker arrivals and (ii) at adequately frequent intervals to meet precision needs—which are commensurate or equivalent to the logged-entries of the aforementioned recent intervening timing marker offset tables.

For each pertinent timing marker arrival-set which arrives during a selected target time interval on a client-receiver U's pathway, either—(i) judiciously choose or (ii) arbitrarily select-and-if-needed-calculate—the positions which are to be indicated by phantom virtual coincident arrival timing markers "$U(N-1)_{TargetArrival}$" and corresponding interval offset from $U(N-1)$ such as at arithmetic mean $U(N-1)_{ArrivalMean}$ or $U(N-1)_{TargetMean}$ for pertinent timing marker arrivals between points $U(N-1)$ and $U(N)$ along the U pathway.

Then for all-or-selected pertinent final-arrival legs-or-hops of timing markers in the aforementioned arrival-set at a client-receiver U, determine (a) the final-arrival-leg's source phantom virtual departure location for the same final-arrival-leg's timing marker and (b) the corresponding phantom virtual timing marker departure time, by using one or more of the following optional steps.

Option #1: use the aforementioned virtual "$U(N-1)_{TargetArrival}$" or "$UX(N-1)_{Arrival}$" point offset, to determine the corresponding phantom virtual "$X(N-1)_{TargetArrival}$" or "$X(N-1)_{Arrival}$" point offset—which should represent the same point as "$U(N-1)_{TargetArrival}$" or "$UX(N-1)_{Arrival}$"

Option #2: retrieve, from receiver U storage, the $X(N-1)$ timing marker arrival data such as (i) the final-leg departure location, (ii) the corresponding time of departure from transmitter X, and any (iii) the corresponding "Recent Intervening Timing Marker Offset Tables" for preceding time intervals Option #3: determine the final-leg $X_{Departure}$ virtual location and corresponding indicated virtual time of departure (i) by using the aforementioned virtual "$X(N-1)_{TargetArrival}$" or "$UX(N-1)_{Arrival}$" point and offsets to find the most recent-or-adjacent final-leg transmitter X timing marker departure location-and-indicated-time and (ii) by looking-up, calculating, interpolating, extrapolating, or otherwise incorporating the corresponding departure-point time-interval-offset and the location-offset.

Note that when circumstances are favorable, this approach can alternatively replace the aforementioned look-up table steps with mathematical calculations such as for: (a) Case 2 situations where interim receiver timing marker arrival intervals are equidistant or describable by simple mathematical equations, (b) Case 3 situations where interim receiver timing marker arrival intervals have uniformly wider or shorter values—or are describable by simple mathematical equations, or (c) Case 4: situations where arriving intervening time intervals from an upstream transmitter are mathematically describable.

(Note: the above paragraphs were for fast moving receivers or significant delays before relay transmissions)

(Subsequent Steps for Processing Stationary, Slow, or Fast—Moving Receivers)

Note: At this step, (a) any pathway final-arrival-legs-or-hops, which are adjacent to the subject receiver, have been identified and (b) the final-hop transmitter positions and corresponding precise time of indicated timing marker departures are known or determinable. The initial indicated transmission points of departure may now be associated with either (a) real timing markers, (b) virtual timing markers, or (c) coinciding timing marker phantom virtual arrivals or equivalently corresponding-or-orchestrated timing marker phantom virtual departures.

For the target client-receiver, adequately or sufficiently map pertinent (a) pathway topologies, (b) pathway sets or cycle-instances, (c) travel time intervals, (d) delays, (e) timing marker arrivals, or (f) time differences of arrival.

Use the aforementioned (a) mappings, (b) time-interval-or-delays, (c) transit time summation equations, (d) final-leg intervals, or (e) trilateration, multilateration, 2-way ranging, or similar calculations to solve for unknown time intervals or locations by using one or more of the following optional methods or steps.

Option #1: create-or-update, weight, or prioritize records pertaining to neighborhood sources of error such as by multipath distortion, ionosphere delays, tropospheric effects, signal strength, timing marker redundancy, etc. To implement and reflect the prioritizations, optionally (a) downsize the number of pathways by eliminating less needed pathways entirely or (b) adjust weighting coefficients for any future least-square-error-or-equivalent calculations with any selected goodness criteria.

Option #2: Form or determine single-value-or-summation times or transit-time-summation-equations, variables, distances, PNT values, or the location of U using the minimum number of equations or an overpopulated criterion implementation (such as least square error) by using one or more of the following approaches: (a) traditional single-hop TRI-LATERATION with optional phantom virtual timing marker alignment adjustments, (b) multiple-hop or single-and-multiple-hop TRILATERATION with optional phantom virtual timing marker alignment adjustments or traditional methods or hardware, (c) traditional single-hop MULTILATERATION with optional phantom virtual timing marker alignment adjustments, (d) multiple-hop or single-and-multiple-hop MULTILATERATION with optional phantom virtual timing marker alignment adjustments or traditional methods or hardware, (e) two-way ranging, (f) RSS or RRSS, (g) angle-side-angle triangulation, or other methods.

Option #3: While using or ignoring pertinent neighborhood signal distortion corrections, use time intervals in either (a) (Single-hop mode) with single-hop time interval pathways directly from originator transmitters A, B, C, D, . . . to any corresponding receivers such as AN-to-UN, BN-to-UN, CN-to-UN, DN-to-UN, etc. or (b) (Multiple-hop or single-and-multiple-hop mode) such as: (i) originating transmitter(s) with single-hop time interval pathways directly from originator transmitters to any corresponding receivers such as directly from an originator transmitter to UN or (ii) relay transmitters which introduce additional intervening pathway time-interval legs such as from an originator transmitter O through AN-to-UN, BN-to-UN, CN-to-UN, DN-to-UN, etc.

Option #4: For stationary receivers, adequately slow-moving receivers, or where any transmission delays are insignificant, use pathway time-interval summation or difference equations to determine pertinent transit time intervals from the transmitters—such as from A to U. For the appropriate set of final-legs to a target receiver or first-legs from a target transmitter—use trilateration or multilateration calculations.

Option #5: For fast moving receivers or significant relay delays and for each selected cycle or instance of timing marker sets, (a) use final-arrival-legs at a corresponding receiver U which have coincident indicated single-point phantom virtual timing marker arrivals on the receiver's pathway (or equivalently use orchestrated phantom virtual timing marker departures) or (b) use the aforementioned "Case 1" look-up tables and/or "Case 2, 3, or 4" regression equations to determine pertinent pathway final-arrival-leg virtual transit time intervals to the receiver—such as (i) From $A(N-1)_{StartMean}$ to the aforementioned target interval offset $U(N-1)_{ArrivalMean}$ or $U(N-1)_{TargetMean}$ or (ii) Using (a) an appropriate original configuration, (b) remapped converging phantom virtual arrival configuration, (c) remapped orchestrated phantom virtual departure configuration, or (d) pathway time-interval transit time summation equations,— to calculate the transit time intervals of pertinent pathway travel for specific individual timing markers to reach a U receiver-locator. This especially includes the final transmission legs to a target receiver or equivalently departure legs from a target transmitter.

Option #6: If necessary, update and reiterate the aforementioned calculations.

Option #7: As appropriate, (1) convert relative locations to absolute locations or (2) convert absolute locations into relative locations.

Option #8: Determine the corresponding velocity for selected instances by (1) subtracting differences in the (N-1), N, or intervening instances of location of U or (2) using other traditional methods.

GENERAL CONSIDERATIONS

One or more of the components, steps, and/or functions illustrated in discussions and examples, herein, may be rearranged and/or combined into a single component, step, or function or embodied in several components, steps, or functions without affecting the operation of the communication device having channel-specific signal insertion. Additional elements, components, steps, and/or functions may also be added without departing from the invention. The novel algorithms described herein may be efficiently implemented in software and/or embedded hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. "Machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

"Machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein.

A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

While certain exemplary embodiments have been described and shown in the accompanying drawings, it is to be understood that such embodiments are merely illustrative of and not restrictive on the broad application, and that this application is not be limited to the specific constructions and arrangements shown and described, since various other modifications may occur to those ordinarily skilled in the art.

The invention claimed is:

1. A positioning-navigation-timing-ranging-and/or-beacon transmission system apparatus, comprising:
   one or more originating transmitters on one or more dispersed platforms;
   one or more corresponding receivers on one or more other dispersed platforms; and
   one or more single-hop timing marker signal pathways with each timing marker signal pathway extending from one of the one or more originating transmitters to one of the one or more corresponding receivers;
   wherein a timing marker is a physical timing marker or a virtual timing marker;
   wherein one or more of the one or more originating transmitters are configured to place one or more timing markers on one or more transmission signals;
   wherein at least one of the one or more originating transmitters is configured to place one or more timing markers on one or more of the one or more transmission signals and at least one of the one or more timing markers is a virtual timing marker;
   wherein the transmission system apparatus is configured to perform at least one of positioning, navigation, timing, ranging, and beacon;
   wherein a physical timing marker in the one or more timing markers indicates the location of a position on one of the one or more transmission signals and comprises a defined signal waveform change; and
   wherein a virtual timing marker indicates the location of a first selected target timing marker position on one of the one or more transmission signals and comprises a message containing a transmitter-side determined displacement or time offset of the first selected target timing marker position from a second indicated position of a physical timing marker or another virtual timing marker in the same or another referenceable transmission signal, which is referenceable both at the transmitter-side determination platform and any corresponding receiver.

2. The system apparatus of claim 1, further comprises:
   (i) one or more relay transmitters on one or more other dispersed relay transmitter platforms; and
   (ii) one or more multi-hop timing marker signal pathways;
   wherein each of the one or more multi-hop timing marker signal pathways extends from one of the one or more originating transmitters through either:
     (i) one of the one or more relay transmitters, or
     (ii) two or more of the one or more relay transmitters which are logically arranged in a sequentially linked relay transmitter chain;
   to one of the one or more corresponding receivers;
   wherein one or more of
     (i) the one or more originating transmitters,
     (ii) the one or more relay transmitters, or
     (iii) both types
   are configured to place one or more timing markers on one or more transmission signals; and
   wherein at least one of
     (i) the one or more originating transmitters and
     (ii) the one or more relay transmitters
   is configured to place at least one virtual timing marker on at least one transmission signal.

3. The system apparatus of claim 1, further comprises:
   at least one originating transmitter which performs one or more of the following actions:
   a) transmits times of selected indicated timing marker departures and/or derivative information thereof;
   b) transmits corresponding transmitter locations at the times of the selected indicated timing marker departures and/or derivative information thereof;
   c) transmits corresponding transmitter platform velocity vectors at the times of the selected indicated timing marker departures; and
   d) transmits any other selected associated pertinent information.

4. The system apparatus of claim 1, further comprises:
   at least one relay transmitter which performs one-or-more of the following actions:
   a) receives one or a combination of the following items:
     (i) primary signals, (ii) tributary signals and (iii) timing-markers;
   b) for selected items of the aforementioned received items, performs one or a combination the following actions: (i) recreating, (ii) merging, (iii) reformatting, (iv) reflecting, and (v) forwarding corresponding timing-markers and any associated-content onto another outgoing transmission signal;
   c) transmits (i) times of selected indicated timing marker arrivals or departures or both and/or (ii) any derivative information thereof;
   d) transmits (i) selected receiver locations or selected transmitter locations or both at times of selected indicated timing marker arrivals or departures or both and (ii) any derivative information thereof;
e) transmits corresponding receiver platform velocity vectors at the times of the selected indicated timing marker arrivals; and
f) transmits corresponding transmitter platform velocity vectors at the times of the selected indicated timing marker departures.

5. The system apparatus of claim 1, the system reduces or eliminates any need to synchronize departures of timing markers by forming and/or using one or more instances and/or arrangements of one of the one or more originating transmitters or relay transmitters transmitting one or more timing markers through each of two or more dispersed single-and/or-multi-hop pathways, which have at least one multiple-hop pathway to a same corresponding receiver platform.

6. The system apparatus of claim 1, reduces or increases straggling of selected indicated arrivals of the one or more timing markers on the one or more single-hop timing marker signal pathways or the one or more multi-hop timing marker signal pathways of one or more moving corresponding receivers of the one or more corresponding receivers which occupy selected regions and/or locales by correspondingly adjusting, advancing, and/or delaying one or more indicated timing marker departure times (i) from one or more of the one or more originating transmitters and/or (ii) from the one or more of the one or more relay transmitters.

7. The system apparatus of claim 6, the straggling is reduced by either or both:
   a. earlier departure times for one or more indicated timing marker departures from one or more of:
      (i) the one or more originating transmitters; and/or
      (ii) the one or more relay transmitters;
   which are relatively farther away than:
      (i) other originating transmitters of the one or more originating transmitters; and/or
      (ii) other relay transmitters of the one or more relay transmitters;
   to each of one or more selected pertinent receivers of the one or more corresponding receivers which are in selected regions and/or locales; and
   b. later departure times for one or more indicated timing marker departures from one or more of
      (i) the one or more originating transmitters and/or
      (ii) the one or more relay transmitters
   which are relatively closer than
      (i) other originating transmitters of the one or more originating transmitters and/or
      (ii) other relay transmitters of the one or more relay transmitters
   to each of one-or-more selected pertinent receivers of the one or more corresponding receivers which are in selected regions and/or locales.

8. The transmission system apparatus of claim 1, is further configured to perform one or more of the following actions:
   a. to have one or more of the one or more originating transmission nodes perform one or more of the following:
      i. transmitting one or more of the one or more transmission signals;
      ii. forming and placing one or more timing markers on one or more of the one or more transmissions signals;
      iii. transmitting the one or more timing markers;
      iv. transmitting times of selected indicated timing marker departure;
      v. transmitting corresponding transmitter platform locations at times of the selected indicated timing marker departure;
      vi. transmitting corresponding transmitter platform velocity vectors at times of the selected indicated timing marker departure;
      vii. transmitting any other associated pertinent information;
   b. to have one or more of the one or more relay transmission nodes perform one or more of the following:
      i. selecting and/or receiving one or more incoming signals and transmitting or reflecting one or more corresponding signals;
      ii. receiving one or more selected timing markers and transmitting or reflecting one or more selected corresponding timing markers;
      iii. transmitting times of selected indicated timing marker arrivals and/or departures and/or delays in relaying;
      iv. transmitting corresponding receiver and/or transmitter locations at times of the selected indicated timing marker arrival and/or departure or transmitting any other associated pertinent information;
      v. receiving one or more single, blended, and/or multiplexed signals and merging, commingling and/or multiplexing any selected timing markers and/or associated content onto one or more other outgoing transmission signals;
      vi. measuring, gathering, determining, and/or forwarding any necessary data which is needed to know and/or determine any instance delays between selected indicated timing marker arrivals and corresponding indicated timing marker departures as well as other selected PNT parameters and/or vectors;
      vii. translating, substituting, and/or converting selected waveforms, format, content, modulations, frequencies, channel capacities, encryptions, or protocols;
      viii. repeating one or more selected signals or timing markers;
      ix. reflecting one or more of the selected signals or the timing markers;
   c. to have one or more of the one or more originating and/or relay transmission nodes perform one or more of the following:
      i. acquire, measure, and/or tag and forward times, time-offsets, and/or displacements of selected indicated signal positions of selected timing marker arrivals and/or departures at selected transmission nodes;
      ii. acquire, measure, and/or, tag and forward data for knowing and/or determining selected corresponding transmission node locations and any other pertinent information for the selected timing marker arrivals and/or departures at transmission nodes;
      iii. acquire, measure, and/or tag and forward data for knowing and/or determining corresponding transmission platform velocity vectors and any other pertinent information for the selected timing marker arrivals and/or departures at the transmission nodes;
   d. to have any groups and/or pairs of two way ranging transmission nodes perform one or more of the following actions:
      i. using one or more of the originating transmitters and/or the relay transmitters to transmit one or more signals having one or more of the one or more timing markers to a receiver node or reflector node;

ii. at one or more of the corresponding receivers, the relay transmitters, and/or reflecting nodes, receiving a signal including receiving one or more of the one or more timing markers and sending an echo timing marker response back to the sending originating and/or relay transmitter along with measurement and/or other data of any corresponding delay between the indicated arrival of a selected signal timing marker and the indicated departure of the echo response timing marker;

iii. at one or more of the corresponding receivers, the relay transmitters, and/or reflecting nodes, reflecting an incoming signal having one or more of the one or more timing markers back to an originating and/or relay transmitter platform;

e. to have one or more beacon transmission nodes perform one or more of the following:
  i. transmitting one or more of the one or more transmission signals;
  ii. either or both:
    a) forming, placing, and transmitting one or more selected timing markers on one or more of the one or more transmission signals;
    b) both (i) before and/or after beacon transmitter design implementation, defining one or more unique and discernible waveform changes as timing markers within pre-existing and/or pre-arranged beacon transmission signal formats of one or more of the one or more transmission signals and (ii) during or after beacon transmitter usage and transmission of one or more beacon transmission signals using the pre-existing and/or pre-arranged transmission signal formats to also, serendipitously, or coincidentally form, place, and transmit the one or more unique and discernible changes as one or more selected indicated target signal positions of either or both selected physical timing markers and at least one selected virtual timing marker and then transmitting those discernible changes and/or indicated timing markers and any corresponding virtual timing marker messages;
  iii. transmitting times of selected indicated timing marker departure;
  iv. transmitting corresponding transmitter and/or beacon platform locations at times of the selected indicated timing marker departure;
  v. transmitting corresponding transmitter and/or-beacon platform velocity vectors at times of the selected indicated timing marker departure;
  vi. transmitting any other associated PNT-ranging-and/or-beacon pertinent information;

f. to form and forward recent intervening timing marker offset tables;

g. to gather, assimilate, and forward information which pertains to downstream user pathway transit time summation equations;

h. to transmit any other selected pertinent information which is necessary to enable downstream determination of one or more of: node-to-node transmission transit times, node-to-node-transmission-distances, final transit legs at target receivers, first-transit legs at target transmitters, receiver node locations, transmitter node locations, beacon parameters, corresponding transmission-pathway angles of arrival or departure at a node, and PNT parameters and/or vectors;

i. to transmit any other selected information which is necessary to enable downstream use of prior art methods when describing hops, delays, or nodes and especially for describing final-legs at target receivers or first legs for target transmitters including information pertaining to one or more of: single-hop pathways, trilateration, one-way ranging, multilateration, two-way ranging, dual frequency transmissions, multi-frequency trilaning, triangulation, angles-of-arrivals, transmitter presence, transmitter proximity, transmitter rate of closure, transmitter direction, RSS received signal strength, RRSS relative received signal strength, multi-hop pathways, iterative multilateration, collaborative multilateration, and other traditional methods; and j. to forward any selected and pertinent timing marker and/or transmitter-node histories-and/or information ultimately to selected and pertinent nodes where determination of transit times, pathway distances, location, or other PNT parameters and/or vectors takes place.

\* \* \* \* \*